US012715205B2

(12) United States Patent
Bauer et al.

(10) Patent No.: US 12,715,205 B2
(45) Date of Patent: Aug. 25, 2026

(54) DEVICE FOR COATING A CARRIER SUBSTRATE WITH A POWDERED MATERIAL

(71) Applicant: KOENIG & BAUER AG, Würzburg (DE)

(72) Inventors: Stefan Bauer, Thüngersheim (DE); Björn Kriege, Veitshöchheim (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 19/117,128

(22) PCT Filed: Sep. 1, 2023

(86) PCT No.: PCT/EP2023/073994
§ 371 (c)(1),
(2) Date: Mar. 31, 2025

(87) PCT Pub. No.: WO2024/149476
PCT Pub. Date: Jul. 18, 2024

(65) Prior Publication Data

US 2026/0008262 A1 Jan. 8, 2026

(30) Foreign Application Priority Data

Jan. 13, 2023 (DE) ..................... 10 2023 100 769.6
Mar. 7, 2023 (DE) ..................... 10 2023 105 523.2

(51) Int. Cl.
*B32B 37/10* (2006.01)
*B32B 5/16* (2006.01)
(Continued)

(52) U.S. Cl.
CPC ............ *B32B 37/1054* (2013.01); *B32B 5/16* (2013.01); *B32B 15/16* (2013.01); *B32B 37/24* (2013.01);
(Continued)

(58) Field of Classification Search
CPC . B32B 37/1054; B32B 37/0053; B32B 37/02; B32B 37/156; B32B 37/24;
(Continued)

(56) References Cited

U.S. PATENT DOCUMENTS 4,949,667 A 8/1990 Yoshida et al.
2015/0007769 A1 1/2015 Miura et al.
(Continued)

FOREIGN PATENT DOCUMENTS

DE 102008009341 A1 8/2008
DE 102012224295 A1 6/2014
(Continued)

OTHER PUBLICATIONS

Machine translation of DE 102008009341 date unknown.*
(Continued)

*Primary Examiner* — John L Goff, II
(74) *Attorney, Agent, or Firm* — MATTINGLY & MALUR, PC

(57) ABSTRACT

Examples relate to a device including a first application unit having a first roller and second roller forming, in a nip between the outer cylindrical surfaces thereof, a first gap through which powdered material can be conveyed to form a first dry film. The second roller, or a further roller following downstream from the second roller, together with a counter-pressure roller forms a second gap through which a carrier substrate is guided to have the dry film applied. The first and the second rollers can be inclined with respect to one another based on a relative progression of axes of rotation thereof and can be varied in relative inclinations. The first or second roller is mounted in the device to be pivotable about an actual or imaginary pivot axis which extends perpendicular to the axis of rotation of the pivotable roller and/or of the other of the two rollers.

14 Claims, 22 Drawing Sheets

(51) Int. Cl.
*B32B 15/16* (2006.01)
*B32B 37/24* (2006.01)
*H01M 4/04* (2006.01)

(52) U.S. Cl.
CPC ....... *H01M 4/0435* (2013.01); *B32B 2457/10* (2013.01)

(58) Field of Classification Search
CPC ....... B32B 5/16; B32B 15/16; B32B 2457/10; H01M 4/0435; H01M 4/8896; Y10T 156/1741; B05C 1/0882; B29C 2043/466; B29C 43/245; B29C 39/44; B29C 66/83413; B30B 3/04
USPC .................................................. 156/555, 501
See application file for complete search history.

(56) References Cited

U.S. PATENT DOCUMENTS

| | | | |
|---|---|---|---|
| 2015/0224529 | A1 | 8/2015 | Hamabe et al. |
| 2017/0066176 | A1* | 3/2017 | Häusl ...................... B29C 55/04 |
| 2020/0227722 | A1 | 7/2020 | Bogenstahl et al. |

FOREIGN PATENT DOCUMENTS

| | | | |
|---|---|---|---|
| DE | 102017208220 | A1 | 11/2018 |
| DE | 102019125269 | A1 | 3/2021 |
| EP | 3996164 | A1 | 5/2022 |
| JP | 5772427 | B2 | 9/2015 |
| KR | 102359521 | B1 | 2/2022 |
| WO | 2001/032312 | A1 | 5/2001 |
| WO | 2020/148410 | A2 | 7/2020 |
| WO | 2020/150254 | A1 | 7/2020 |
| WO | 2022/169237 | A1 | 8/2022 |

OTHER PUBLICATIONS

Machine translation of DE 102012224295 date unknown.*
International Search Report of PCT/EP2023/073994 dated Dec. 1, 2023.

* cited by examiner

DEVICE FOR COATING A CARRIER SUBSTRATE WITH A POWDERED MATERIAL

CROSS-REFERENCES TO RELATED APPLICATIONS

This application is the US national phase, under 35 USC § 371, of PCT/EP2023/073994, filed on Sep. 1, 2023, published as WO 2024/149476 A1 on Jul. 18, 2024, and claiming priority to DE 10 2023 100 769.6 filed on Jan. 13, 2023, and DE 10 2023 105 523.2 filed on Mar. 7, 2023, and all of which are incorporated by reference herein in their entireties.

TECHNICAL FIELD

Some examples herein relate to a device for coating, in particular dry coating, a carrier substrate with a powdered material. For example, the device may include at least one application unit, which comprises a first roller and a second roller, adjacent to the first roller, forming, in a nip between outer cylindrical surfaces thereof, a first gap through which the powdered material can be conveyed to form a dry film, the second roller or a further roller following downstream from the second roller, viewed in the direction of the material stream, together with a roller that is effective as a counter-pressure roller forming a second gap, through which a carrier substrate to be coated can be guided and can have the dry film formed in the first gap applied thereto.

BACKGROUND

In WO 2020/150254 A1, a film is generated by calendering a powder mixture and is wound onto a reel so as to be supplied as such to a further process in which it can be laminated onto a collector. In one embodiment, the powder mixture is deposited onto a belt and is guided thereon into the roller nip of two rollers.

A device for dry coating a current collector web with an active material layer is disclosed by KR 102359521 B1, wherein a first roller and a second roller are provided for each side of the web, between which an active material layer is formed, and wherein the respective active material layer is applied onto the current collector web at a nip point between the two second rollers. A first and a second unit for setting the roller spacing are provided, by which the respective distances between the first and second rollers can be set. The first and second units comprise a mechanical cylinder that is driven by a servo motor. Furthermore, a third unit for adjusting the roller nip formed between the second rollers is provided. It is stated that, in this way, the thickness of the electrode can be easily controlled by way of the gap width. In one embodiment, furthermore an air cylinder can be provided between the second rollers, by way of which the spacing is kept constant.

DE 10 2008 009 341 A1 relates to grinding, mixing, dispersing, homogenizing or the like liquid to paste-like masses in a roller train comprising multiple rollers that are each supported on two end faces in bearing seats, wherein the mass is successively transported from a first roller to a last roller, this being a removal roller, and there is removed by a scraper. The distance or the engagement of two outer rollers of three rollers with respect to a center roller can be varied by pivoting of the bearing seats. The bearing seats at the end faces of at least one of the rollers are designed so as to be adjustable transversely to the roller axis independently of one another by respective eccentric bearings in such a way that a position that is in a crossed arrangement in relation to the other roller can be set by deflecting the eccentrics in opposite directions.

In WO 2020/148410 A2, in one of the shown variant embodiments a film is formed in the gap between a first and a second roller and is applied in a gap between the second and a third roller to a substrate web that is guided through this gap.

WO 2022/169237 A1 relates to a laminating device for producing an electrode unit comprising a roller pair, by which a first electrode, a separator, a second electrode, a second separator and a third electrode can be pressed together. Each of the rollers of the roller pair can be individually pressed against one another at the end faces by pressure cylinders.

SUMMARY

It is an object of examples herein to create a device for coating, in particular dry coating, a carrier substrate with a powdered material.

The object is achieved in some examples by the device discussed above in which the first and the second rollers can be inclined with respect to one another based on the relative progression of the axes of rotation thereof and can be varied in the relative inclinations thereof in that the first or the second roller is mounted in the device so as to be pivotable about an actual or imaginary pivot axis which extends perpendicular to the axis of rotation of the pivotable roller and/or of the other of the two rollers, and that the first and the second rollers of the first application unit are mounted in or on differing frame sections, and that the frame section carrying the pivotable roller overall, that is, including the frame walls that are assigned on both sides and connected to one another and the roller carried by these frame walls, can be pivoted about the pivot axis.

The advantages achievable by the invention are in particular that a coated carrier substrate, comprising an active material layer that is as even as possible and/or defined, can be reliably produced by the device.

In an embodiment that is particularly suitable for the invention for such a device for coating, in particular dry coating, a carrier substrate with a powdered material, this device comprises at least one first application unit, which comprises a first roller and a second roller forming, in the nip between the outer cylindrical surfaces thereof, a first gap used for forming the film, through which powdered material can be conveyed so as to form a first dry film, and a roller that is effective as a counter-pressure roller, which, together with the second roller or a further roller of the first application unit following directly or indirectly downstream from the second roller, viewed in the direction of the material stream, forms a second gap through which a carrier substrate to be coated can be guided and can have the dry film that is formed in the first gap and in particular transported via the second roller, and optionally the further roller, to the second gap applied thereto.

According to the invention, the first and the second rollers can be inclined with respect to one another based on the relative progression of the axes of rotation thereof and can be varied in the relative inclinations thereof in that the first or the second roller is mounted in the device so as to be pivotable about an actual or imaginary pivot axis which extends perpendicular to the axis of rotation of the pivotable roller. This enables a crossed arrangement of the rollers so as to thereby compensate for bending caused by the contact forces and achieve a constant gap width across the width.

For the inclined or pivotable embodiment of the roller, the axes of rotation extending inclined with respect to one another are preferably located in two parallel planes and/or the pivotable mount is provided and/or designed in such a way that the pivoting movement of the axis of rotation takes place in a plane that extends perpendicular to the adjustment direction for the adjustment of the distance and/or of the contact force between the first or the second roller and/or perpendicular to the pivot axis, without this plane moving toward the pivot axis as a result of the pivoting movement and/or without the pivot axis changing the position thereof in space.

As a result of an advantageous pivoting of the axis of rotation in a plane that is perpendicular to the adjustment direction and/or fixed in space, an adjustment movement and a pivoting movement can be decoupled.

In a particularly advantageous embodiment comprising rollers that can be inclined with respect to one another, the first and second rollers of the relevant application unit are mounted in or on differing frame sections and the frame section carrying the pivotable roller overall, that is, including the frame walls that are assigned on both sides and connected to one another and the roller carried by these frame walls, can be pivoted about the pivot axis.

In the particularly advantageous embodiment including the multi-piece frame and a pivoting of the frame sections, a crossed arrangement of the roller axes in relation to one another is possible, without additional shearing forces acting on the end-face bearings or even without there being the risk of bearing damage due to inclination.

In a particularly advantageous embodiment for the adjustment of the rollers or frame sections, one or more adjustment devices comprising a drive means are provided between two or two respective adjacent frame sections, which engage with a respective active end on the frame sections and are designed in such a way that a tensile force effectuating a relative movement between the frame sections and/or a contact force between the rollers can be introduced between the adjacent frame sections. This means that the frame or bearing of a roller there is not pushed starting from an outer fixed bearing against the other roller, but the two adjacent frames are subjected to tensile forces that are directed at each other and are moved or pulled toward one another at least for a throwing-on. The force therefore acts precisely and only between these two rollers, and does not act on a possibly adjacent further roller via one of the two rollers.

In a particularly advantageous embodiment of the positioning mechanism, an adjustment device having two active ends that can be varied in terms of the distance with respect to one another engages on two or respective two adjacent frame sections that can be varied in terms of the distance with respect to one another and/or in terms of the contact force with respect to one another in such a way that the same, in particular imaginary, plane extending perpendicular to the axis of rotation of at least one of the rollers mounted on the two adjacent frame sections intersects at least one engagement surface that is formed in the region of the active ends with the relevant respective frame section and a respective effective support width, viewed in the axial direction, of the rollers mounted in the two frame sections.

In a particularly advantageous embodiment of the coating device, a dry film can be produced on both sides of the carrier substrate. In an advantageous embodiment of such a coating device, application units comprising a respective laminating roller are provided on both sides of the substrate path, which in a nip between the outer cylindrical surfaces thereof form a two-sided application or laminating gap. The two laminating rollers forming the gap between one another act with respect to one another as counter-pressure rollers. As a result, the dry films formed in the respective application unit can be applied to both sides of the carrier substrate which is guided between these laminating rollers.

BRIEF DESCRIPTION OF THE DRAWINGS

Exemplary embodiments of the invention are illustrated in the drawings and will be described in greater detail below. The figures show.

DETAILED DESCRIPTION

Figure 1:
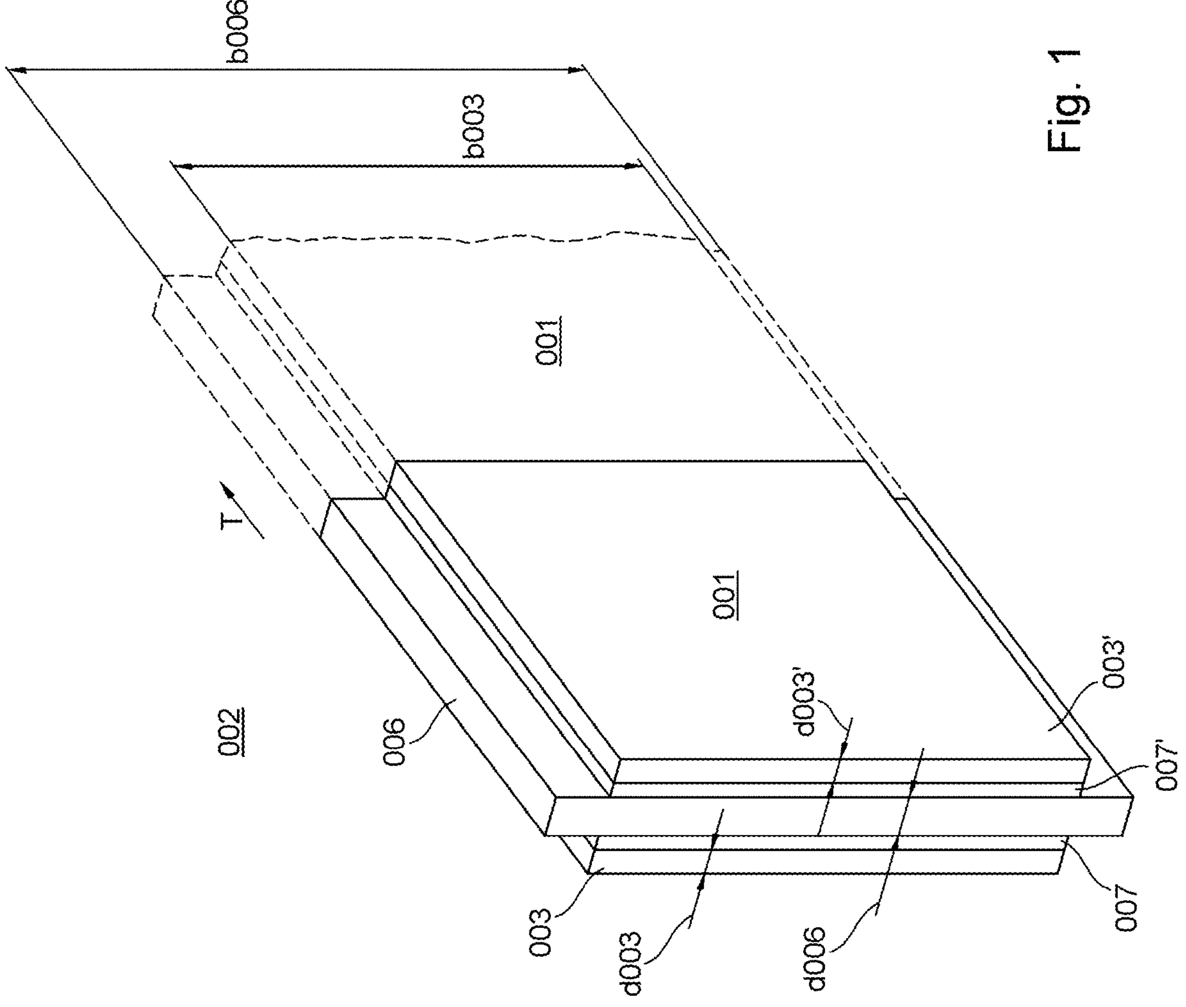
FIG. 1 a schematic representation of a product to be produced.

The devices or machines described hereafter relate to the production of electrode units 001 of electrochemical storage systems as they are used, in particular, in batteries or rechargeable batteries, such as lithium-sulfur, sodium-ion or in particular lithium-ion batteries, as well as in solid-state batteries.

A product 001; 002 to be produced by a machine described below can, for example, be formed by a, for example web-format, intermediate product 002 that is still to be cut, for example a product strand 002 designed as an electrode strand 002, or by sheet-format end products 001 that have already been cut in the machine, for example as product sections 001 formed as electrode units 001, electrodes 001 for short.

For producing such products 001; 002 having a material layer 003; 003', in particular active material layer 003; 003', which is applied to one side or both sides of a carrier substrate 006, preferably a carrier substrate web 006, for example a current collector substrate 006 formed by, for example, a current collector foil 006, preferably applied in the form of a dry film 003; 003', a device 100; 100* for coating, coating device 100; 100* for short, in particular for dry coating an, in particular web-format, for example above-described, carrier substrate 006 with an above-described material layer 003; 003', preferably a dry film 003; 003', in particular a powder composite film 003, is provided, which comprises at least one first application unit 101, by which powdered, preferably dry, material 004; 004', in particular a preferably solvent-free and/or dry powder mixture 004; 004' can first be processed to a dry film 003, in particular by way of compression and/or using a compression force, and thereafter this dry film 003; 003' can be applied to a first side of the carrier substrate 006, in particular by way of pressing and/or using a contact pressure force. A dry film 003; 003' to be applied is to have, for example, a thickness of 20 μm to 240 μm, preferably of 40 μm to 100 μm, for example after the application and compression.

An above-described powder mixture 004; 004', which is in particular present as dry powder, comprises, in particular for the production of electrode units 001 for lithium-ion batteries or rechargeable batteries, for example more than ninety percent by weight of an active material, such as one or more of the lithium compounds: lithium iron phosphate, lithium manganese oxide, nickel-rich lithium nickel manganese cobalt oxide, lithium nickel cobalt aluminum oxide, lithium cobalt oxide, lithium manganese nickel oxide and/or lithium titanate, few, for example three, percent by weight of a conductive additive, for example graphite or so-called CNTs, that is, multi-walled carbon nanotubes, and few, for example two, percent by weight of a plastic that is effective as binding agent in the later powder composite, for example polytetrafluoroethylene (PTFE).

The carrier substrate 006 at the same time, for example, represents the current-collecting layer of the electrode unit 001 and is formed, for example, by electrically conductive material, for example a metal, designed in the form of a film, non-woven fabric or woven fabric. It is made, for example, of aluminum or copper, in particular for the production of electrode units 001 for lithium-ion batteries or rechargeable batteries, and/or, for example, has a thickness d006 of 5 to 16 μm. If an anode is produced, it is made in particular of copper having, for example, a thickness d006, for example, in the range of 5 to 13 μm, and if a cathode is produced, it is made in particular of aluminum having, for example, a thickness d006 in the range of 7 to 16 μm.

In a preferred embodiment, the carrier substrate 006, at least in the surface region to be coated with the dry film 003; 003', has a superficial coating with a cohesion-supporting or cohesion-inducing agent 007; 007', for example a binder 007; 007', a primer 007; 007' or an adhesive 007; 007'. Such an agent 007; 007' can be formed by a thermoplastic or reactive binder or primer and can, for example, comprise a thermoplastic component and/or have a thickness d007 of only few μm, for example no more than 5 μm, in particular no more than 3 μm.

A thickness d003; d003' of the active material layer 003; 003' of the product 001; 002, that is, of the electrode unit 001 or of the electrode strand 002, is, for example, no more than 240 μm, in particular no more than 150 μm, preferably at most 100 μm, and/or is, for example, at least 20 μm, in particular at least 30 μm, preferably at least 40 μm.

For example, after passing through a calendering process that follows the application or coating of the carrier substrate 006 with the dry film 003, 003' inline or in a further machine, an overall thickness of the product 001; 002 coated, for example, on both sides, is, for example, up to 500 μm, in particular up to 320 μm, preferably up to 220 μm and/or at least 50 μm, in particular at least 70 μm, preferably at least 90 μm. A density of the applied material 004, 004' is, for example, greater than 3000 $kg/m^3$, preferably greater than 3500 $kg/m^3$. An intermediate product 002, which is also referred to here, for example, as a pre-product, leaving the machine for pure coating, that is, without subsequent calendering, can optionally have a lesser density, however, for example, of at least 2000 $kg/m^3$, preferably of at least 2500 $kg/m^2$, in particular of at least 2900 $kg/m^3$. When only one side is coated, the overall thickness of the finished product 001; 002, which is optionally further compacted by at least one calendering process, is, for example, up to 255 μm, in particular up to 165 μm, preferably up to 65 μm and/or at least 30 μm, in particular at least 40 μm, preferably at least 50 μm.

If sufficiently large forces are available during the coating process or simultaneously with the application of the dry film 003, 003' or if such forces can be applied in the laminating gap, the above-described values for the total thickness and/or the density of the end product 001 or of the intermediate product 002 only to still be cut transversely, for example, can also be achieved without subsequent calendering provided downstream from the coating process.

To ensure an effective manufacturing process, preferably web-format carrier material 006 is processed to an above-described end or intermediate product which, for example, has a width b006 of at least 300 mm, advantageously at least 500 mm, in particular at least 550 mm, or even 600 mm and more, in an advantageous embodiment even up to 1,200 mm. The carrier material 006 is, for example, not coated over the entire width with the dry film 003; 003', but only up to an omitted edge region in which the surface of the metallic conducting carrier material 006 remains clear and accessible, for example for the purpose of being connected to cables. Such a width b003 of the coating is, for example, at least 200 mm, advantageously at least 230 mm, or even 300 mm and more.

Figure 2:
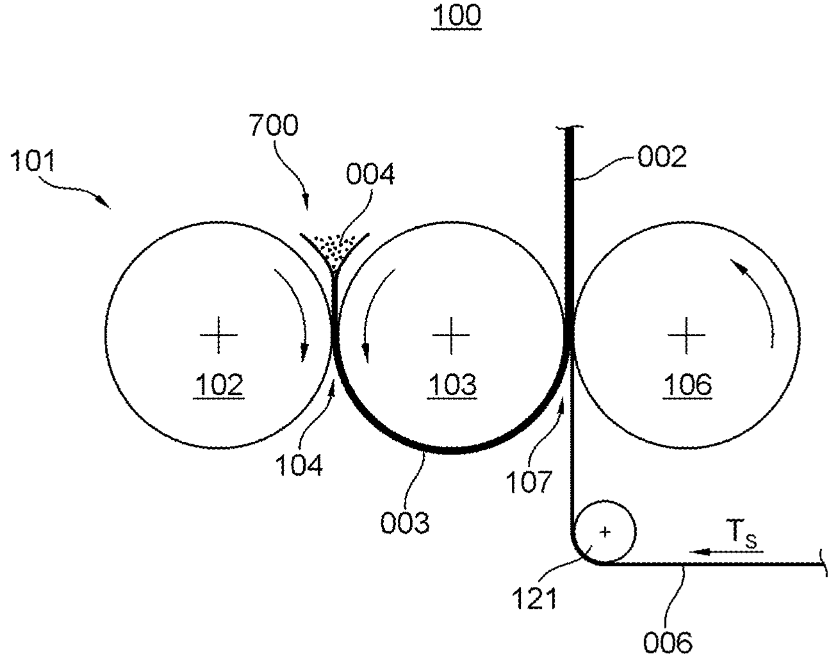
FIG. 2 a schematic diagram for the generation and the application of a dry film.
Figure 3:
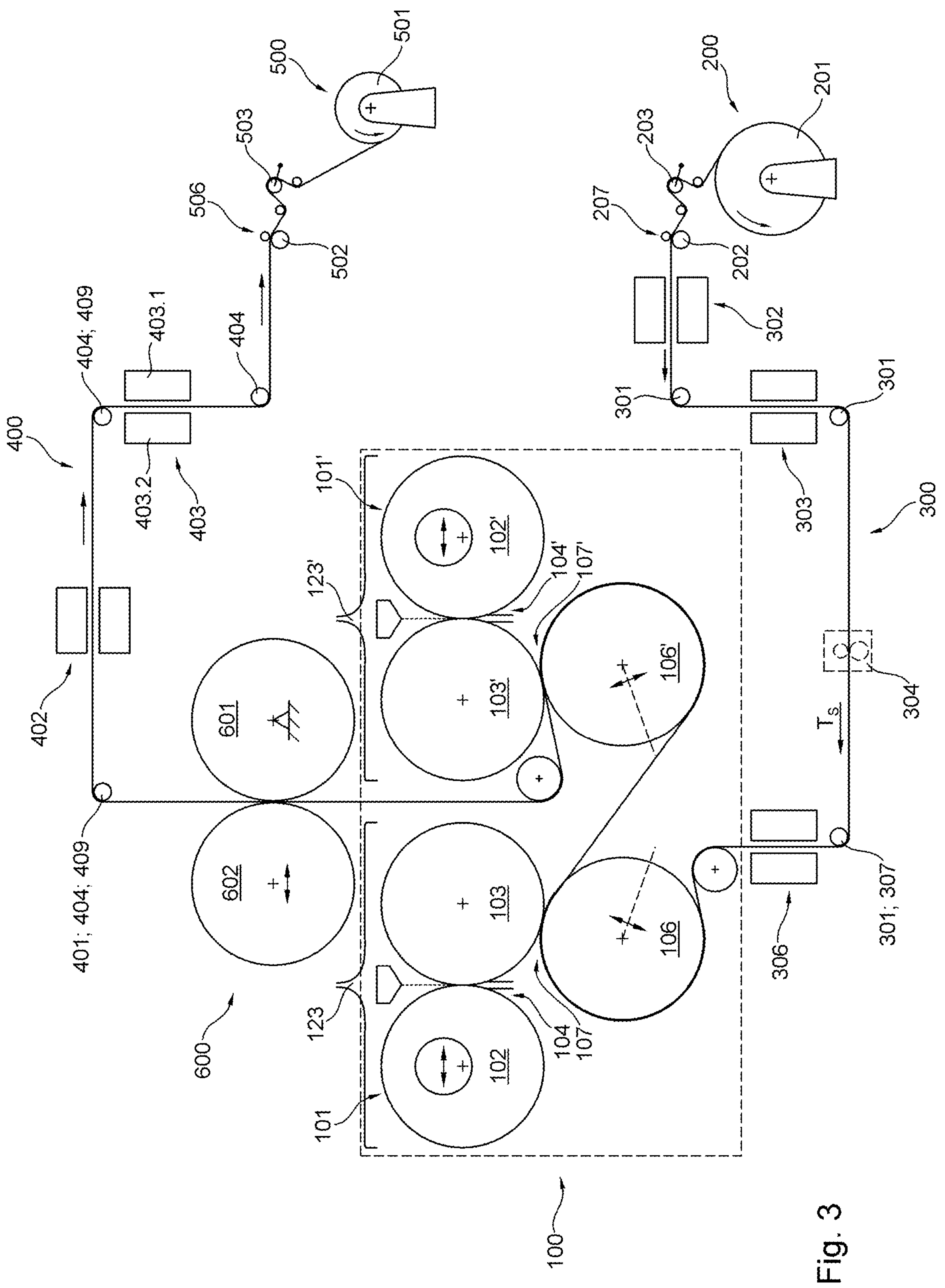
FIG. 3 an exemplary embodiment of a machine for producing a multi-layer product including a dry film that is applied to a carrier substrate with an application stage according to one embodiment of a first group of exemplary embodiments.
Figure 4:
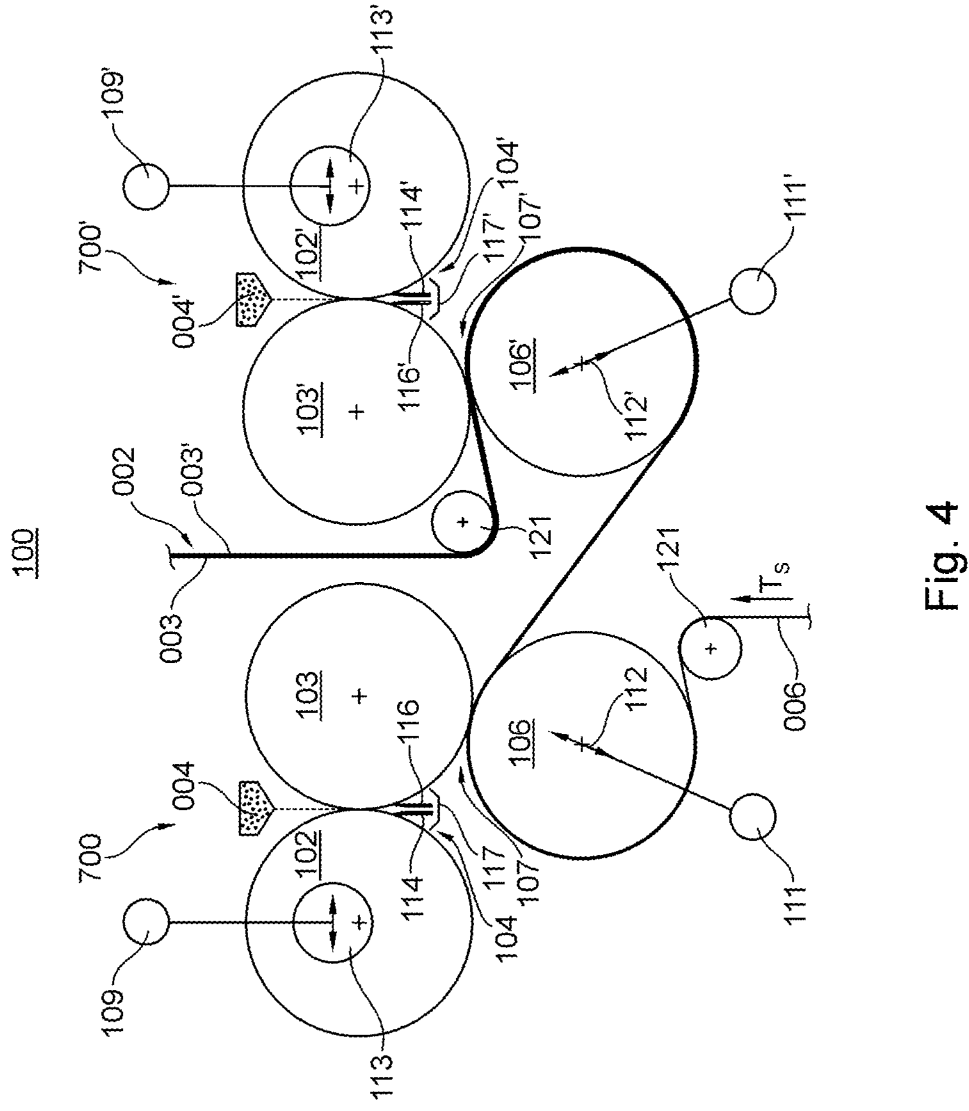
FIG. 4 an enlarged view of the application stage of the first embodiment from FIG. 3.

For the above-described production of a dry film 003, a first roller 102, in particular a metering roller 102, and a second roller 103, in particular a laminating roller 103 of the first application unit 101, are provided so as to form, in the nip between the outer cylindrical surfaces thereof, a first gap 104, in particular a first film-forming gap 104, through which, for the purpose of forming the dry film 003, the powder mixture 004 which is conveyed into the nip, for example by a device for feeding powdered material 700, a powder feed device 700 for short, can be conveyed (see, for example, FIG. 2). An inside width of the first gap 104 at the narrowest point thereof determines the thickness of the dry film 003, which may still be larger compared to the thickness in the later product 001; 002, even before the same passes an application point at which it is applied, in particular under pressure, to the carrier substrate 006.

The application point here is preferably formed directly by a nip of the second roller 103, which in this case is effective as a laminating roller 103, with a roller 106; 103 that is effective as a counter-pressure roller 106; 103' or by a roller which cooperates with the second roller directly or indirectly via one or more further rollers and which is effective as a laminating roller, with a roller 106; 103 that is effective as a counter-pressure roller 106; 103' (not shown here). The second or further roller effective as the laminating roller 003 and the roller 106; 103 effective as the counter-pressure roller 106; 103 form, in the nip between the outer cylindrical surfaces thereof, a second gap 107, in particular an application gap 107, hereafter also, for example, referred to as a laminating gap 107, through which the carrier substrate 006 can be guided, to which, in particular from the side facing away from the counter-pressure roller 106; 103, the dry film 003 which is formed via the first film-forming gap 104 and, for example, is at least 40 μm thick, for example between 50 μm and 200 μm, in particular 60 to 120 μm thick, can be applied.

In a preferred embodiment, the application stage 100; 100* comprises a second application unit 101' (see, for example, FIG. 3 to FIG. 13), by which likewise an, in particular solvent-free and/or dry, powder mixture 004', which is conveyed, for example, by a second device for feeding powdered material 700', powder feed device 700' for short, into the nip, can first be processed to a second dry film 003'; 003, in particular by way of compression and/or using a compression force, and thereafter this second dry film 003'; 003 can be applied to the other, second side of the carrier substrate 006, in particular by way of pressing and/or using a contact pressure force. This can generally be the same powder mixture 004' or a powder mixture that differs from the first powder mixture 004'.

A first roller 102', in particular metering roller 102', and a second roller 103', in particular laminating roller 103', are also preferably provided in the second application unit 101' so as to form, in the nip between the outer cylindrical surfaces thereof, a first gap 104', in particular a second film-forming gap 104', through which the powder mixture 004' can be conveyed for forming the second dry film 003'.

Here as well, the second roller 003' of the second application unit 101' directly, or a roller (not shown here) which cooperates with the second roller 103' directly or indirectly via one or more further rollers and is effective as a laminating roller, in the nip between the outer cylindrical surfaces, can form a gap 107'; gap 107 with a roller 106'; 103 that is effective as the counter-pressure roller 106'; 103, through which the carrier substrate 006 can be guided and have the second dry film 003' formed via the second film-forming gap 104'; 104 applied thereto, in particular on the second side facing away from the second counter-pressure roller 106'; 103.

In a first group of exemplary embodiments for the coating device 100 (see, for example, FIG. 3 to FIG. 7), a second gap 107' is formed by a second application gap 107', for example laminating gap 107', which differs from the first application or laminating gap 107', with a second roller 106', which is in particular effective as a counter-pressure roller 106 and effective second counter-pressure roller 106' that differs from the first counter-pressure roller 106 and/or from the laminating roller 103 of the first application unit 101, through which the carrier substrate 006 can be guided and have the second dry film 003' formed via the second film-forming gap 104' applied thereto, in particular on the second side facing away from the second counter-pressure roller 106'. In this embodiment, two independent application units 101; 101' are provided for the two sides of the carrier substrate 106. It is thus possible to set conditions in the relevant laminating gap 107; 107' for the particular job which independently differ from one another. For example, a different compression force or linear force and/or possibly temperature can be set.

For such an embodiment, it is possible, for example with respect to a large wrap, for the metering roller 102; 102', the laminating roller 103; 103' and the counter-pressure roller 106; 106' forming the laminating gap 107; 107' with the latter to be arranged in the respective application unit 101; 101' in a first variant embodiment with respect to one another in such a way that the planes connecting the axes of rotation R102; R103; R106; R102'; R103' of the respective adjacent rollers 102; 103; 106; 102'; 103'; 106" intersect at an angle α, which is, for example, between 40° and 130°, in particular between 70° and 110°, preferably between 80° and 100°. A large wrap can cause a better heat transfer from a possibly temperature-controlled counter-pressure roller 106; 106' and/or improved, for example flutter-free, run-up and run-off (see, for example, FIG. 3 to FIG. 5).

The particular counter-pressure roller 106; 106' can thus, for example, be arranged beneath the laminating roller 103; 103' in such a way that the plane connecting the axes of rotation R103; R106; R103' of the two rollers 103; 103'; 106; 106' deviates from the vertical by no more than ±30°, in particular no more than ±15°. In the process, the compression force in the laminating gap and gravitation act predominantly in the same direction.

In a second variant embodiment, which is advantageous, for example, with respect to the effective forces and load directions, the metering roller 102; 102', the laminating roller 103; 103' and the counter-pressure roller 106; 106' forming the laminating gap 107; 107' with the latter are arranged, for example, in such a way with respect to one another in the respective application unit 101; 101' that the planes connecting the axes of rotation R102; R103; R106; R102'; R103' of the rollers 102; 103; 106; 102'; 103'; 106', which are in each case adjacent in pairs, intersect at the most at an acute angle α that is no more than 20°, in particular 0°, so that the axes of rotation R102; R103; R106; R102'; R103' of the three rollers 102; 103; 106; 102'; 103'; 106' of the same application unit 101; 101' are located in the same plane. This makes the arrangement very rigid since the forces and counter-forces are at least predominantly directed against one another.

Figure 7:
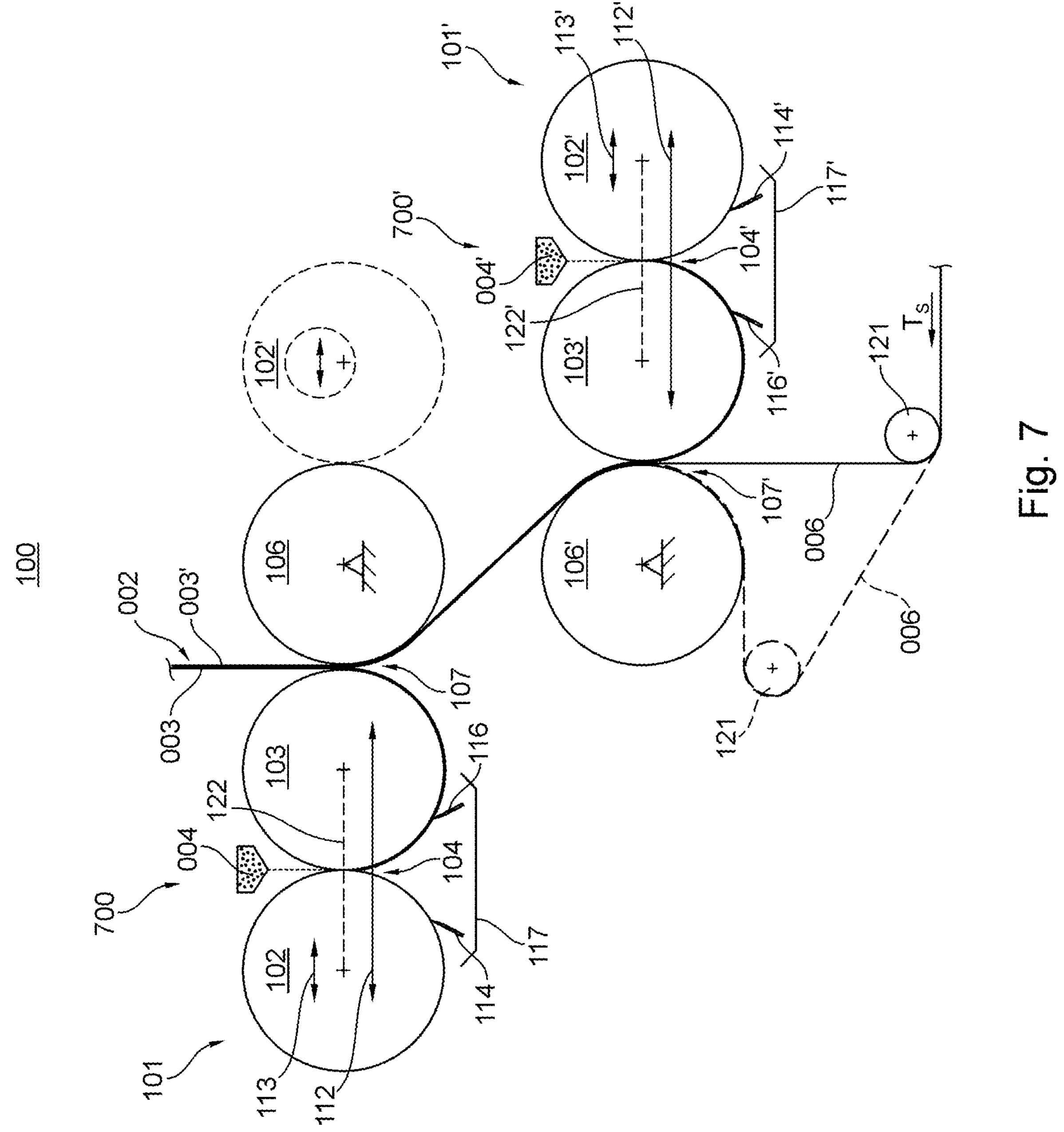
FIG. 7 a further alternative embodiment of the embodiment of a first group of exemplary embodiments.

The two application units 101; 101' are located with the laminating rollers 103; 103' thereof on different sides of the substrate path and can be arranged on top of one another in such a way that the two laminating gaps 107; 107' in one embodiment are located vertically directly on top of one another (see, for example, FIG. 6) or in another embodiment are horizontally offset from one another, in particular by at least half a laminating roller diameter and no more than one and a half laminating roller diameter (see, for example, FIG. 7). Based on FIG. 7, a substrate guidance that can also be applied to other embodiments is indicated by way of example by a dotted line, by way of which a larger wrap angle, and thus better heat transfer and/or more stable run-up, can be implemented. For this purpose, the substrate path is or is being deflected by an additional substrate guide element 121 in such a way that the transport direction $T_S$ during the run-up on the succeeding roller 106; 106' runs at least 45° inclined with respect to the transport direction $T_S$ of the exiting substrate 006.

Figure 5:
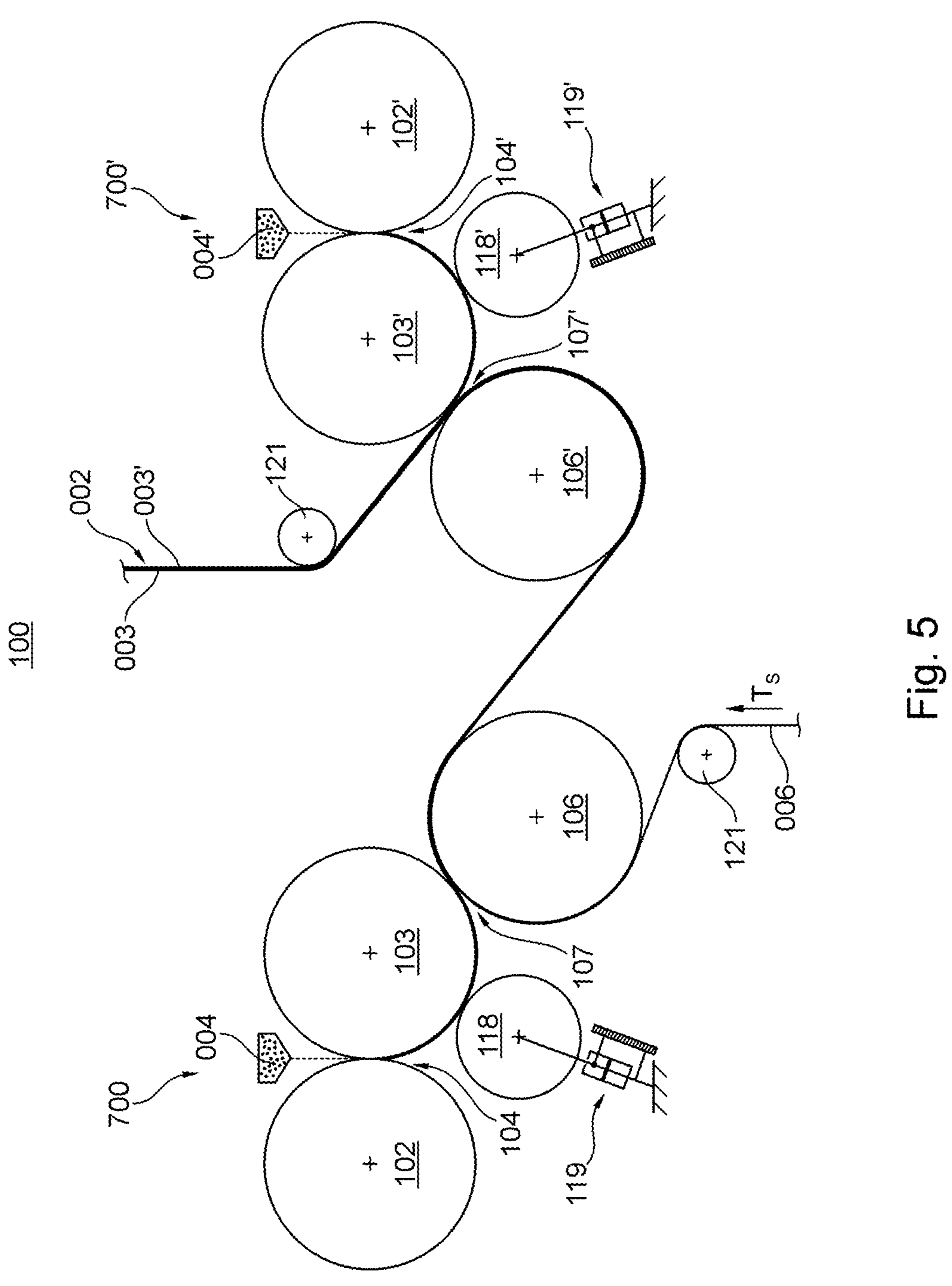
FIG. 5 an alternative embodiment of one embodiment of the first group of exemplary embodiments.
Figure 6:
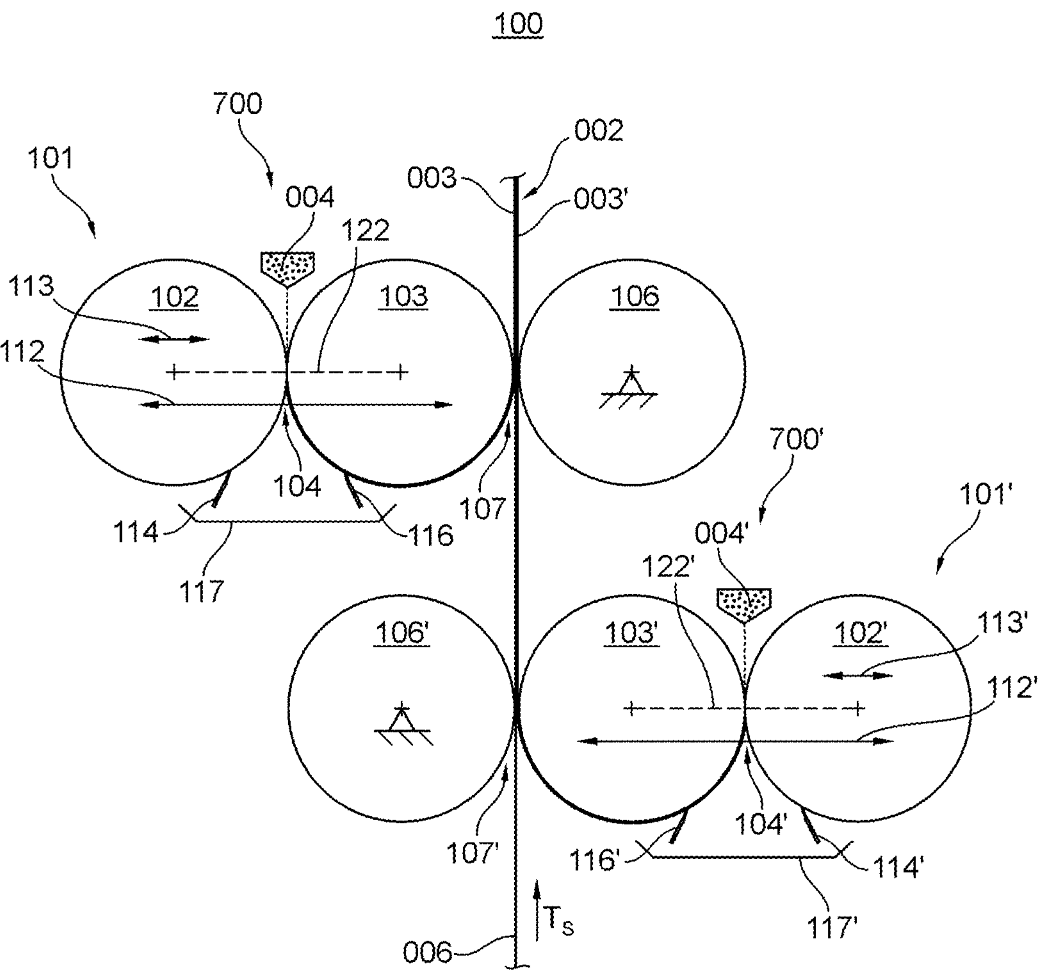
FIG. 6 a further alternative embodiment of the embodiment of a first group of exemplary embodiments.

In addition to the metering roller 102; 102', the second roller 103; 103' or a roller that cooperates with the second roller directly or indirectly via one or more further rollers and is effective as a laminating roller, a further roller 118; 118' (see, for example, by way of example for all embodiments of the first group in FIG. 5) can be provided in an advantageous refinement, which in a circumferential section, which during normal operation, that is, during production operation, guides the dry film 003; 003', between the metering gap 104; 104' and laminating gap 107; 107', the laminating roller 103; 103' in the form of a calendering roller 118; 118' can be placed against a dry film 003; 003' that is to be guided or is guided on the laminating roller 103; 103'.

For the above-described embodiments, variant embodiments and specific embodiments, it is possible, in a first configuration of the roller mount, for the laminating roller 103; 103' of the respective application unit 101; 101' to be mounted so as to be stationary, during normal operation, with the axis of rotation R103; R103' thereof, even though it may be adjustable in the position thereof, and for the metering roller 102; 102' and the counter-pressure roller 106; 106' in each case to be mounted so as to be adjustable in a direction having at least one movement component toward the assigned laminating roller 103; 103' and/or away therefrom by way of respective positioning drives 109; 109'; 111; 111'. Here and hereafter, the term of a positioning drive 109; 109'; 111; 111' shall be understood to mean the entirety of the means that effectuate and/or enable the direct or indirect adjustment of a roller 102; 102'; 103; 103'; 106; 106', which hereafter are also referred to as positioning means 109; 109'; 111; 111', and encompasses at least one positioning mechanism 112; 112'; 113; 113' guiding the roller 102; 102'; 103; 103'; 106; 106' along an adjustment movement as well as one or more drive means 132; 132'; 133; 133' effectuating the adjustment.

For placing the respective metering roller 102; 102' against the second roller 103; 103', a position-based positioning drive 109; 109' or positioning means 109; 109' is provided in a first design for a position-based adjustment, that is, a positioning drive 109; 109' or positioning means 109; 109' by way of which the component to be adjusted can be moved into a defined position. A position-based positioning drive 109; 109' or position-based positioning means 109; 109' can, for example, be positioned with respect to a predefined and/or defined position or can be operated or adjusted so as to be position-controlled by closed loop control or even position-controlled by open loop control.

Such a position-based positioning drive 109; 109' can be implemented, for example, by a drive means 132; 133, for example drive motor, itself being able to assume a defined and specifiable position, such as is possible, for example, for a closed loop position-controlled servo drive or motor, or by an adjustment path, at least toward the relevant side, being delimited, for example, by stop means 119 that can be adjusted by positioning and/or drive means 146, for example an adjustable stop 119, which defines the end position and against which the component to be adjusted in terms of the position is placed or can be placed by means of a, for example, force-based or not positionally accurate drive means. The roller 102; 102' is mounted, for example, in or at a positioning mechanism 112; 112'; 113; 113' which is formed by a bearing mechanism 112; 112'; 113; 113' implementing the adjustment path, for example, in a positionally accurate manner. Such a mechanism is advantageously provided, for example, by a bearing 113; 113' comprising an eccentric, for example a triple ring bearing 113; 113', in particular for small adjustment paths at large forces. With respect to, for example, a position that is parallel to the adjustment direction and thus more direct in terms of the adjustment path, however, a linear bearing 112; 112' extending in the adjustment direction may also be advantageous instead.

For adjusting the respective counter-pressure roller 103'; 106; 106', a force-based positioning drive 111; 111 or positioning means 111; 111' is or are provided in this first advantageous design for a force-based adjustment, that is, a positioning drive 111; 111' or positioning means 111 by way of which a throwing-on with a defined force against the abutment can be implemented. A force-based positioning drive 111; 111' or force-based positioning means 111; 111' can, for example, be adjustable with respect to a predefined and/or defined force or can be operated or adjusted so as to be force-controlled by open loop control or even force-controlled by closed loop control.

Such a force-based positioning drive 111; 111', which is in particular provided on at least one side, can be implemented, for example, in that a drive means 132, for example a drive motor 132, itself can apply a defined and specifiable force, such as is possible, for example, for a closed loop moment-controllable or open loop moment-controllable, in particular closed loop torque-controllable or open-loop torque-controllable servo drive or motor, or in that the roller to be adjusted can be placed against the other roller 103; 103' with an adjustment force toward the relevant side by a drive means actuatable by means of a pressurized medium, for example by a pneumatically or hydraulically actuated cylinder-piston system 132; 133, wherein the pressure of the drive means 132; 133 is preferably settable. The counter-pressure roller 106; 106' is mounted, for example, in or at a positioning mechanism 112; 112'; 113; 113', which is formed by a bearing mechanism 112; 112' that implements the adjustment force in a force-based manner, that is, without additional mechanical delimitation of the adjustment path. This can advantageously be formed, for example, by a bearing mechanism 112; 112' designed as a linear bearing 112; 112', at least on one side, but preferably on both sides.

In a second design, however, the metering roller 102; 102' can conversely be adjustable in a force-based manner, and the counter-pressure roller 106; 106 can be adjustable in a position-based manner. For this purpose, what was described above must be appropriately transferred and applied.

In a third design, however, both rollers 102; 102'; 106; 106 can be adjustable in a force-based manner, and in a fourth design both rollers 102; 102'; 106; 106 can be adjustable in a position-based manner. For this purpose, what was described above must be appropriately transferred and applied.

In a particularly advantageous fifth design, a combined positioning mechanism 112; 113; 112'; 113' and/or a combined positioning drive 109; 109'; 111; 111' or combined positioning means 109; 109'; 111; 111' are provided for adjusting at least the metering roller 102; 102' and/or at least for adjusting the counter-pressure roller 106; 106', which selectively allows a position-based adjustment of the relevant roller 102; 102'; 106; 106' or a force-based adjustment.

Such a combined positioning drive 109; 109'; 111; 111' is formed, for example, by a positioning drive 109; 111; 109'; 111' or positioning means 109, 111; 109', 111' comprising a positioning mechanism 112; 112'; 113; 113', in the adjustment path of which selectively a stop 119, which can be positioned, for example, by drive and/or positioning means, can be introduced for limiting the position. As an alternative, a positioning drive 109, 111; 109', 111' which comprises, as drive means 132, 133; 132', 133', a selectively closed loop position-controlled or open loop position-controlled or closed loop moment-controlled or open loop moment-controlled motor 132, 132'; 133, 133', in particular servo motor, is also advantageous.

In a second configuration for the roller mounting, the counter-pressure roller 106; 106' of the respective application unit 101; 101' can be mounted so as to be stationary, during normal operation, with the axis of rotation R106; R106' thereof, even though it may be adjustable, and the laminating rollers 103; 103', with the respective assigned metering roller 102; 102', can be mounted so as to be adjustable in pairs in a direction having at least one movement component toward the assigned counter-pressure roller 106; 106' and/or away therefrom by way of respective shared bearing mechanisms 112; 112' and/or positioning drives 111; 111', and additionally the respective metering rollers 102; 102' can be mounted so as to be adjustable in a direction having at least one movement component toward the respective assigned laminating roller 103; 103' and/or away therefrom by way of bearing mechanisms 112; 112'; 113; 113' and/or positioning drives 109; 109'; 111; 111'.

In a first advantageous design, a position-based positioning drive 109; 109' within the above meaning, for example a bearing mechanism 112; 112'; 113; 113' formed by a triple ring bearing 113; 113' or by a linear bearing 112; 112'; 113'; 113' can be provided for this purpose, for example on one side or both sides, for adjusting the respective metering roller 102; 102'. A force-based positioning drive 111; 111 within the above meaning can be provided for adjusting the laminating rollers 103; 103'; in pairs with the respective assigned metering roller 102; 102'.

In a second design, however, the metering roller 102; 102' can conversely be adjustable in a force-based manner, and the roller pair 103, 102; 103', 102' can be adjustable in a position-based manner. For this purpose, what was described above must be appropriately transferred and applied.

In a third design, however, the metering roller 102; 102' and the roller pair 103, 102; 103', 102' can be adjustable in a force-based manner, and in a fourth design the metering roller 102; 102' and the roller pair 103, 102; 103', 102' can be adjustable in a position-based manner. For this purpose, what was described above must be appropriately transferred and applied.

In a particularly advantageous fifth design, a combined positioning mechanism 112; 113; 112'; 113' is provided for adjusting at least the metering roller 102; 102' and/or at least for adjusting the roller pair 103; 102; 103', 102' within the above meaning and/or in the above design, which selectively allows a position-based or force-based adjustment of the pair toward the counter-pressure roller 106; 106'; 103'; 103.

In a second group of exemplary embodiments for the coating device 100* (see, for example, shown in FIG. 8 to FIG. 12, FIG. 15, FIG. 16, FIG. 17 and FIG. 18), the second roller 003' of the second application unit 101' or a roller of the second application unit 101' cooperating with the second roller 103' directly or indirectly via one or more further rollers, together with the second or further roller 103 of the first application unit 101 effective as the laminating roller 103, in a nip between the outer cylindrical surfaces thereof, form a shared gap 107 that is effective as a two-sided laminating gap 107, wherein the two laminating rollers 103; 103' forming the gap 107 between each other are effective with respect to one another as counter-pressure rollers 103'; 103. The carrier substrate 006 can be guided through the latter and has the respective dry film 003'; 003 formed via the first and second film-forming gaps 104; 104' applied thereto, in particular on both sides. Such an arrangement of two application units 101; 101' cooperating for the simultaneous two-sided application is also referred to hereafter as a double application unit 101, 101'.

The planes formed in the respective application unit 101; 101' by the axes of rotation R102; R103; R102'; R103' of the metering roller 102; 102' and the laminating roller 103; 103', for example, intersect at the most at an acute angle α, which, for example, is no more than 20°, advantageously no more than 5°, in particular 0°, so that in the latter case the axes of rotation R102; R103; R106; R102'; R103' of the rollers 102; 103; 106; 102'; 103'; 106' of the two application units 101; 101' cooperating in a two-sided laminating gap 107 are located in the same plane or extend parallel to, but vertically offset from one another.

Figure 8:
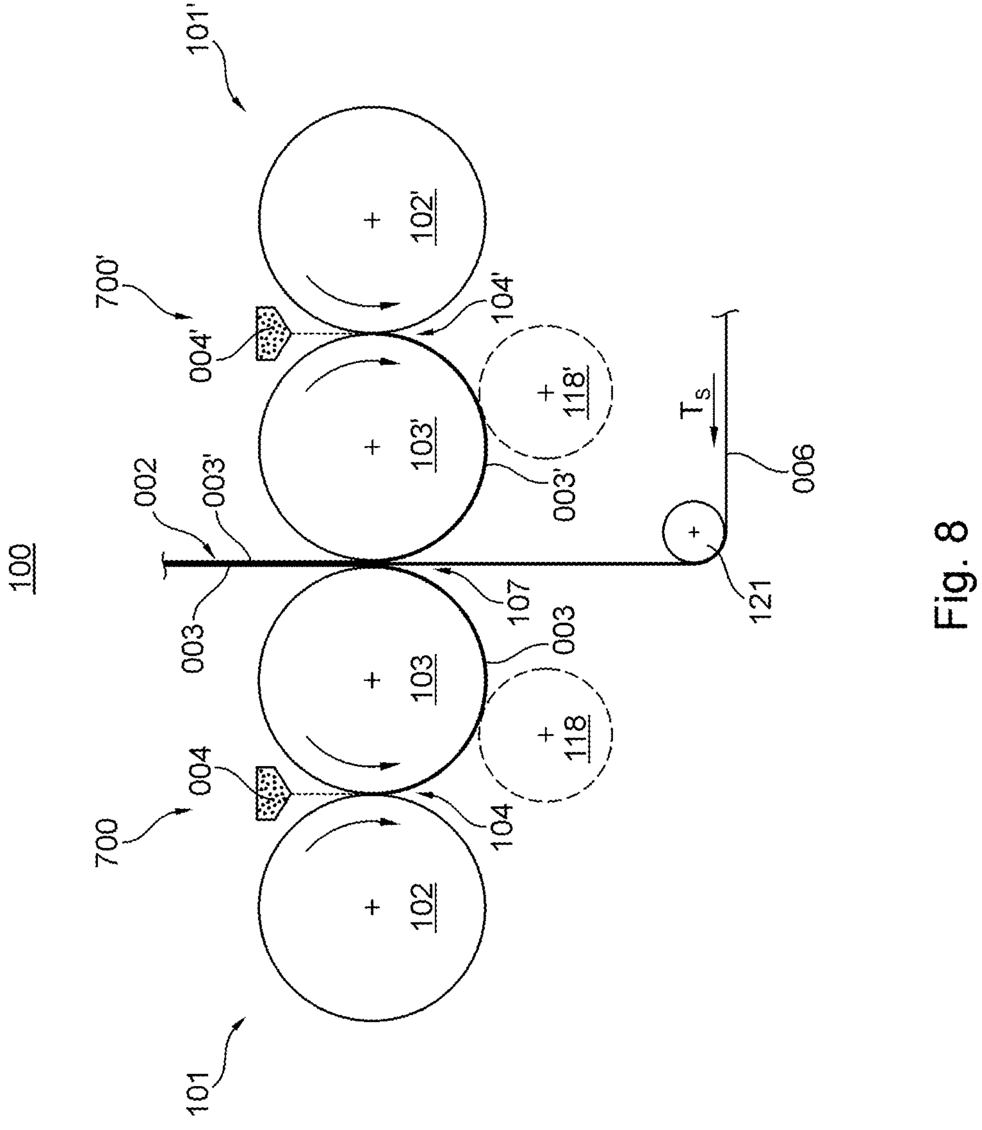
FIG. 8 a schematic diagram of one embodiment of a second group of exemplary embodiments.

In a first variant embodiment, the two planes extend in a shared horizontal plane or horizontally, but vertically offset from one another (see, for example, FIG. 8).

In a second advantageous variant embodiment, for example with respect to a smaller wrap, the two planes extend in a shared plane that is inclined with respect to the horizontal or in two planes that are inclined with respect to the horizontal, but are offset vertically from one another. The shared plane is, or the two offset planes are, for example, inclined with respect to the horizontal by an acute angle β of 2° to 15°, in particular 3° to 10° (see, for example, FIG. 9).

Figure 9:
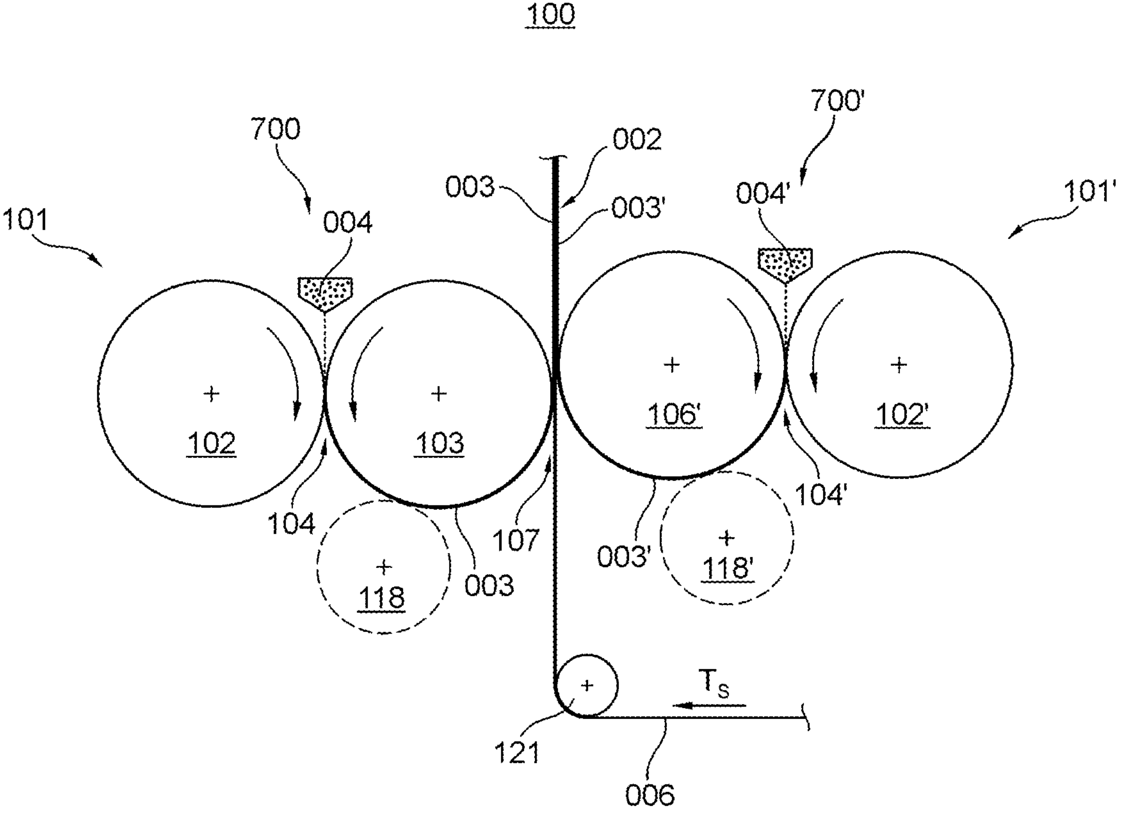
FIG. 9 a schematic diagram of a further embodiment of a second group of exemplary embodiments.
Figure 10:
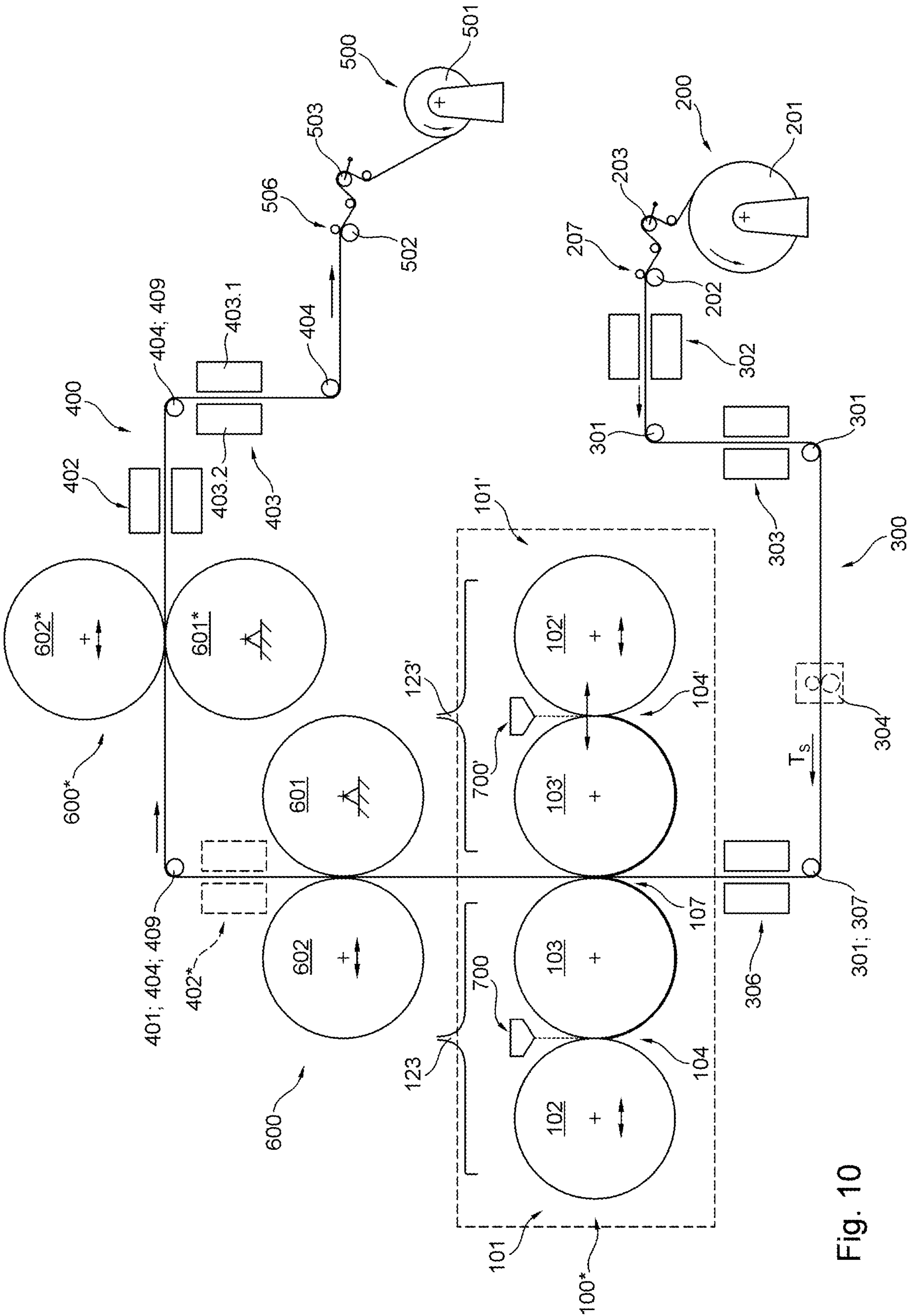
FIG. 10 an exemplary embodiment of a machine for producing a multi-layer product including a dry film that is applied to a carrier substrate with an application stage according to one embodiment of the second group of exemplary embodiments.
Figure 11:
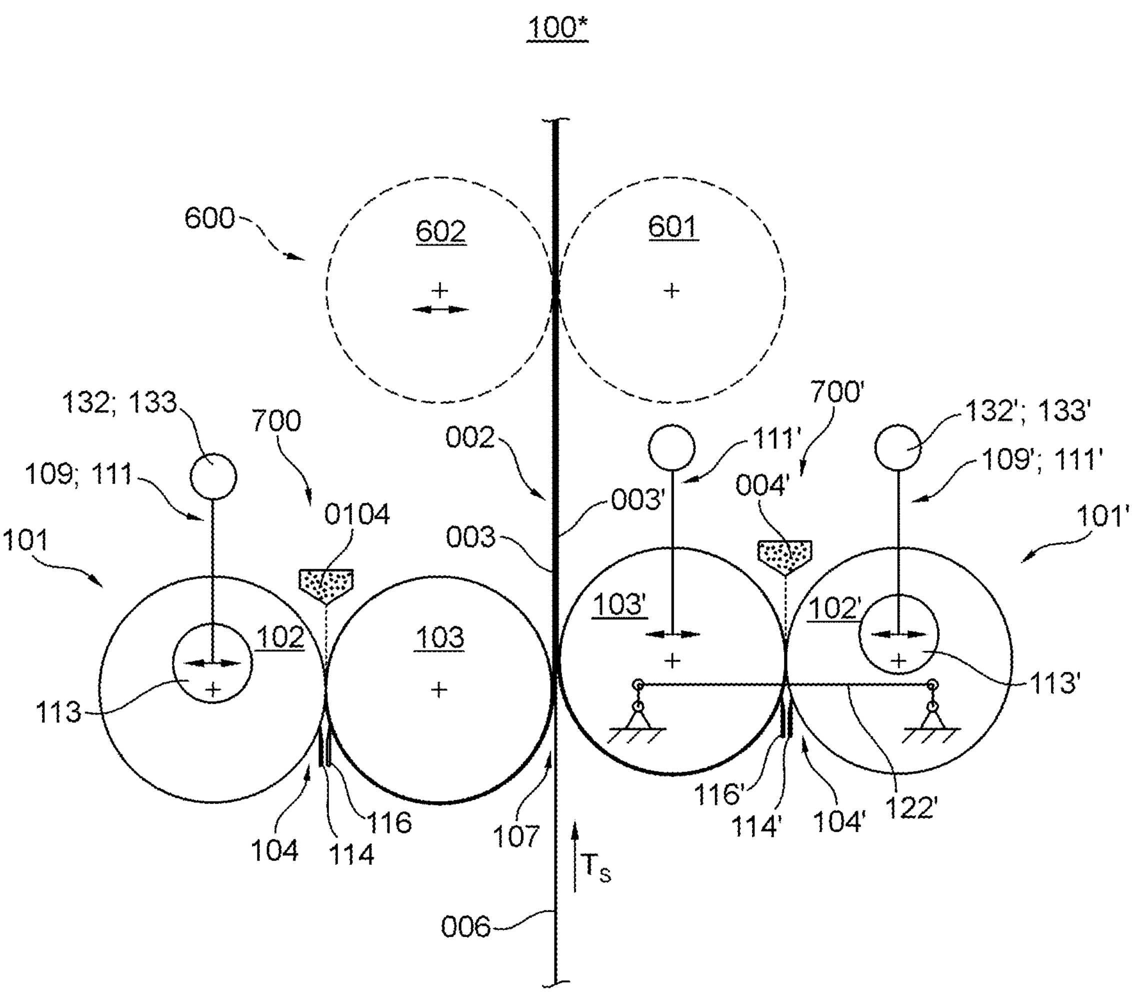
FIG. 11 an enlarged view of the application stage from FIG. 10 with the coupling of two rollers in pairs in a first design.

In addition to the respective metering roller 102; 102' and the second roller 103; 103', in an advantageous refinement a further roller 118; 118' in the above-described form of a calendering roller 118; 118' can also be provided here (see, for example, by way of example dotted for all embodiments of the second group in FIG. 8 and FIG. 9).

For the above-described variant embodiments and specific embodiments, in a first configuration of the roller mount, a first of the two laminating rollers 103 or a further roller, effective as a laminating roller, of a first of the two application units 101 can be mounted so as to be stationary, during normal operation, with the axis of rotation R103 thereof, even though it may be adjustable, while the second of the laminating rollers 103' or a further roller, effective as a second laminating roller, together with the assigned metering roller 102; 102', are mounted so as to be adjustable in pairs in a direction having at least one movement component toward the assigned counter-pressure roller 106; 106' and/or away therefrom by way of a shared bearing mechanism 112; 112' and/or a shared positioning drive 109; 109'; 111; 111', and additionally the respective metering rollers 102; 102' are mounted so as to be adjustable in a direction having at least one movement component toward the respective assigned laminating roller 103; 103' or further roller and/or away therefrom by way of bearing mechanisms 112; 112'; 113; 113' and/or positioning drives 109; 109'; 111; 111'. If one or more further rollers are present between the metering roller 102; 102' and the roller effective as a laminating roller, these are, for example, also adjustable together in a direction having at least one movement component toward the assigned counter-pressure roller 106; 106' and/or away therefrom by way of the shared bearing mechanism 112; 112' and/or the shared positioning drive 109; 109'; 111; 111'.

For the adjustment of the respective metering roller 102; 102', a position-based positioning drive 109; 109' within the above meaning and/or in an above-described embodiment is provided in a first advantageous design. For the adjustment of the second laminating roller 103' in pairs with the assigned metering roller 102', a force-based positioning drive 111; 111' can be provided for a force-based adjustment within the above meaning and/or in an above-described embodiment.

In a second design, however, the metering roller 102; 102' can conversely be adjustable in a force-based manner, and the roller pair 103, 102; 103', 102' can be adjustable in a position-based manner. For this purpose as well, what was described above must be appropriately transferred and applied.

In a third design, however, both rollers 102; 102'; 106; 106' can be adjustable in a force-based manner, and in a fourth design both rollers 102; 102'; 106; 106' can be adjustable in a position-based manner. For this purpose, what was described above must be appropriately transferred and applied.

In an advantageous fifth design, a combined positioning mechanism 112; 113; 112'; 113' is provided for adjusting at least the metering roller 102; 102' and/or at least for adjusting the roller pair 103; 102; 103', 102' within the above meaning and/or in the above embodiment, which selectively allows a position-based adjustment of the pair against the laminating roller 103'; 103 effective as a counter-pressure roller 103'; 103 via a position-based positioning drive 109; 109' and a force-based adjustment via a force-based positioning drive 111; 111'.

Figure 17:
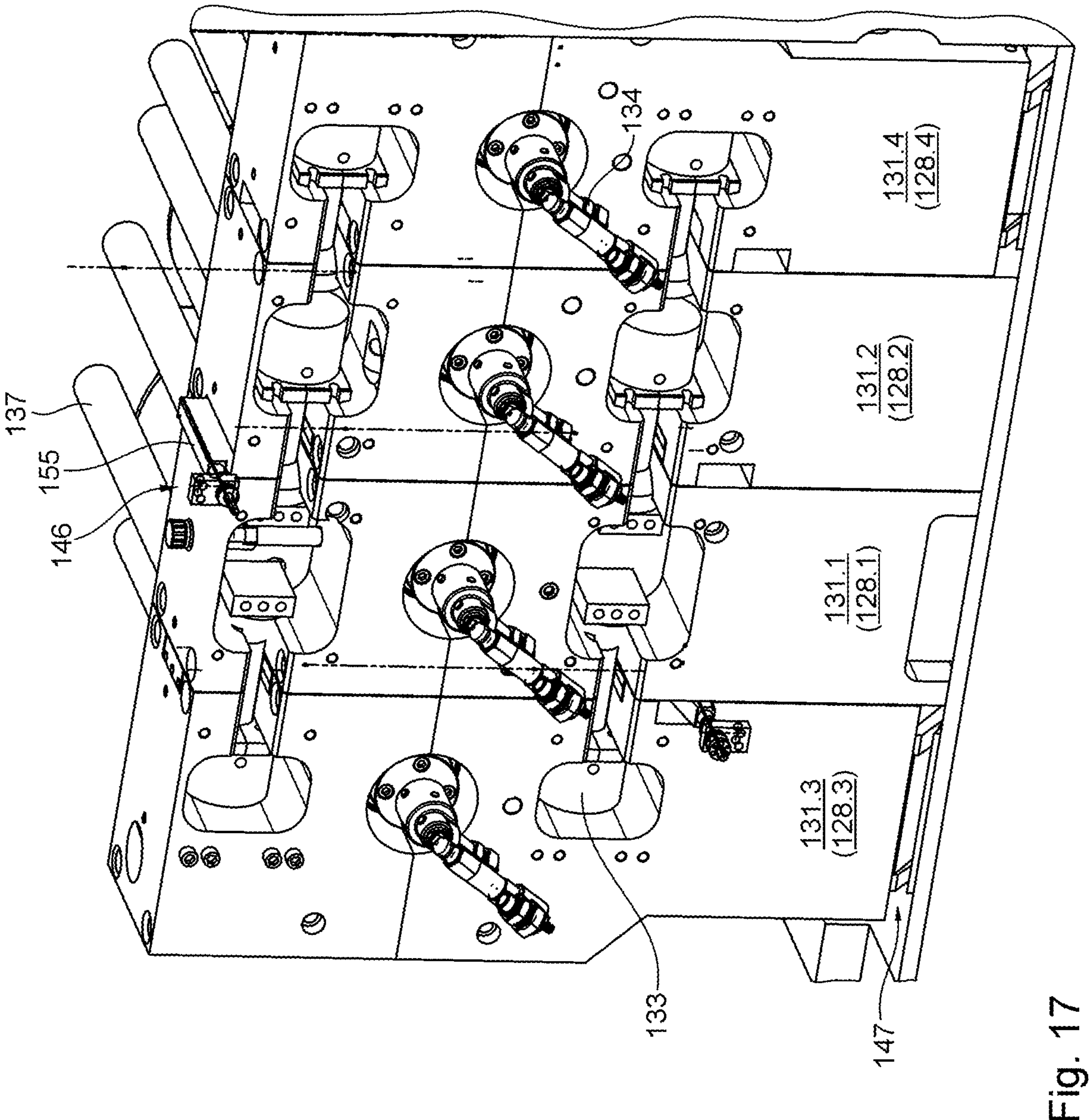
FIG. 17 a perspective representation of an exemplary embodiment of an application unit, in particular double application unit, comprising a multi-piece frame.
Figure 18:
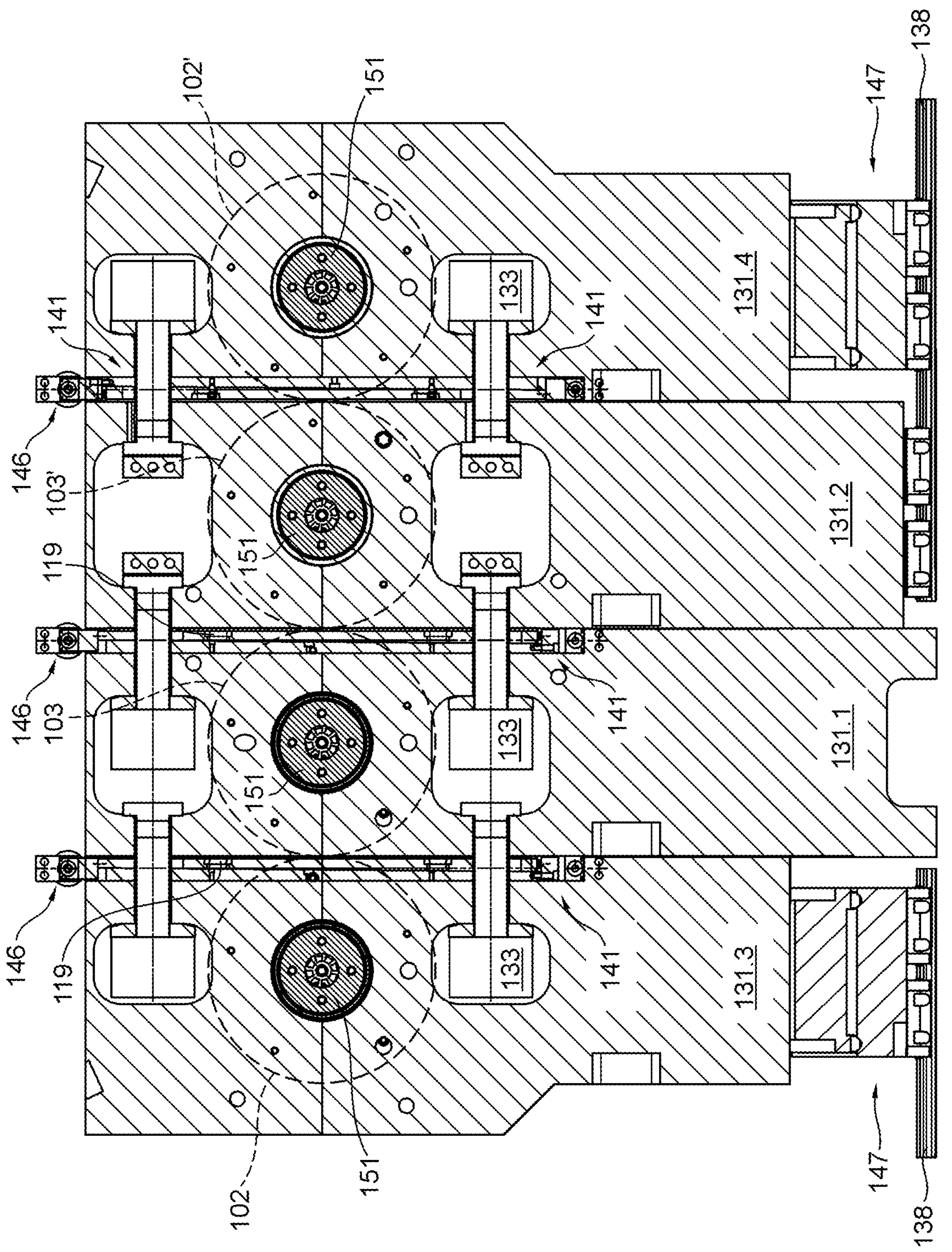
FIG. 18 a sectional illustration of an exemplary embodiment of an application unit according to FIG. 17, in particular double application unit, comprising a multi-piece frame.
Figure 20:
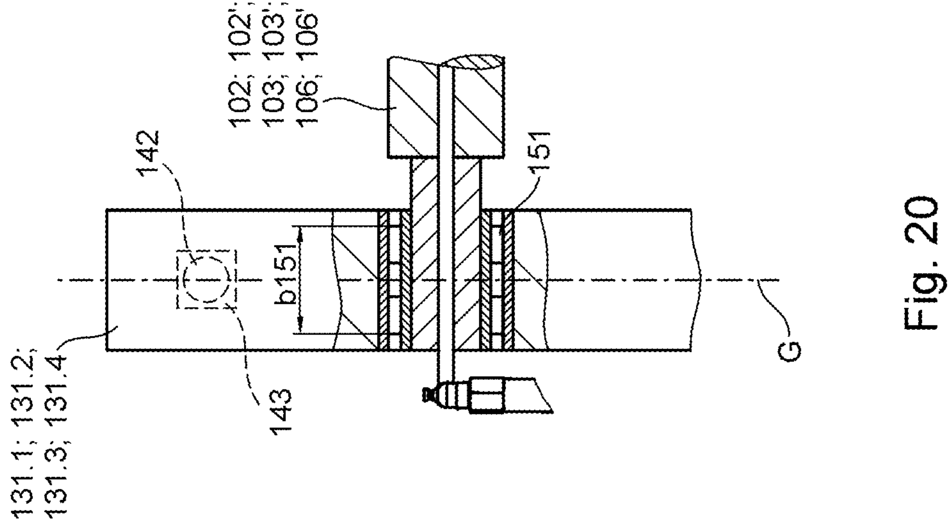
FIG. 20 a schematic sectional illustration through a bearing region of a frame section.
Figure 19:
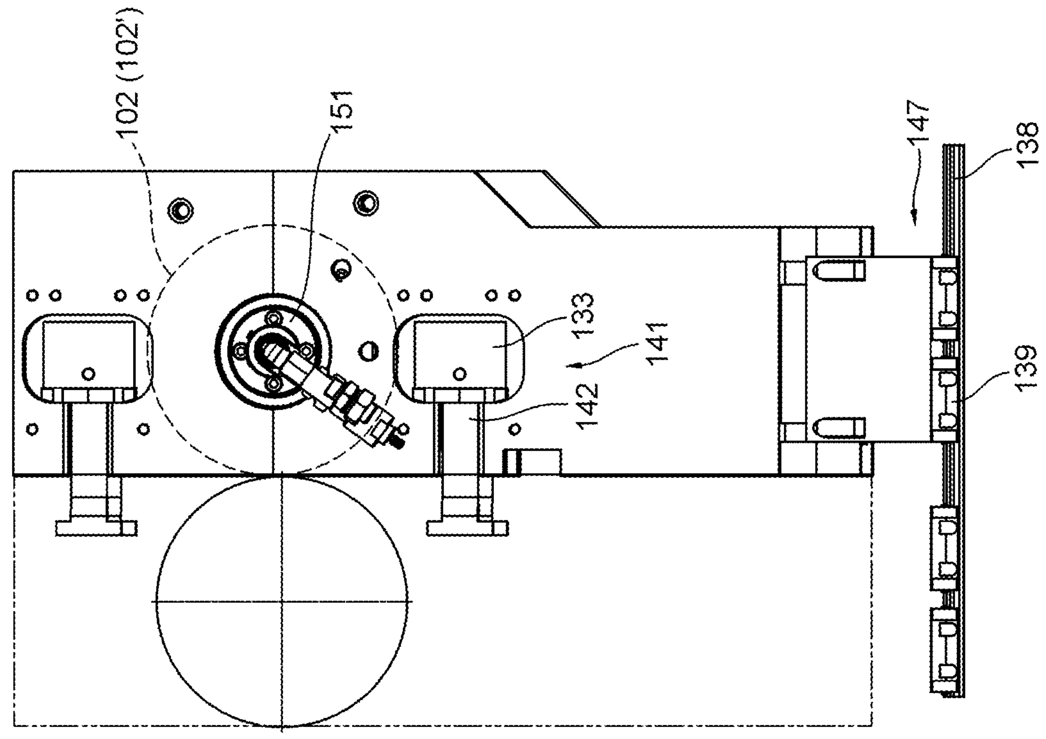
FIG. 19 a sectional illustration through a frame section of a multi-piece frame.
Figure 21:
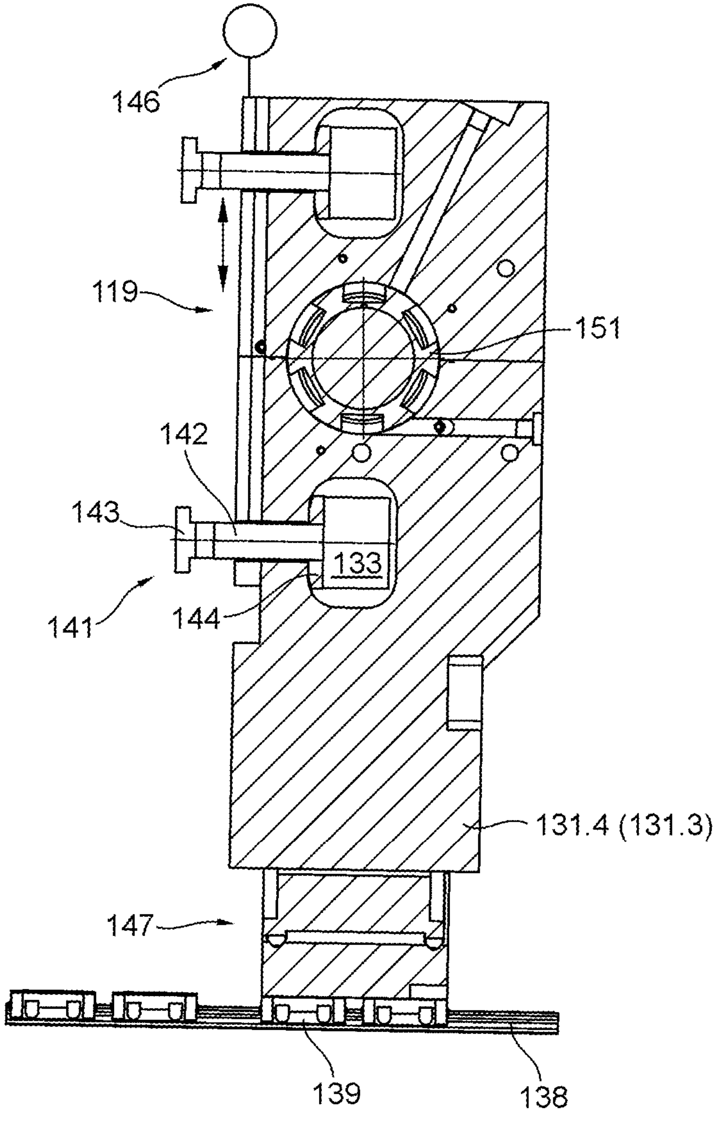
FIG. 21 a sectional illustration through a frame section comprising stop means for delimiting the throw-on movement.

In an advantageous sixth design, which will be described in greater detail below, for example, in connection with FIG. 17 and FIG. 18, a position-based positioning drive 109; 109' within the above meaning and/or in an above-described embodiment is provided for adjusting the first gap 104; 104' of the particular metering roller 102; 102', and a force-based positioning drive 111; 111' for a force-based adjustment within the above meaning is provided for adjusting the second gap 107 or for adjusting the counter-pressure roller 103', wherein the two metering rollers 102; 102' as well as the counter-pressure roller 103; 103' to be adjusted can each be adjusted alone, that is, without coupling in pairs. In a particularly advantageous refinement of this embodiment, a combined positioning mechanism 112; 113; 112'; 113' within the above meaning and/or in the above embodiment is provided for adjusting at least the metering roller 102; 102' and/or for adjusting the second gap 107 or for adjusting the counter-pressure roller 103'.

For all embodiments of the two groups of exemplary embodiments comprising jointly adjustable rollers 103'; 102'; 103; 102, these can be mounted on both sides in carriers 122'; 122, in particular in side parts of a subframe, which, in turn, are mounted by way of bearing mechanisms 112'; 112; 113'; 113 formed by linear bearings 112'; 112; 113'; 113 in a frame receiving the application units 101; 101'.

Figure 12:
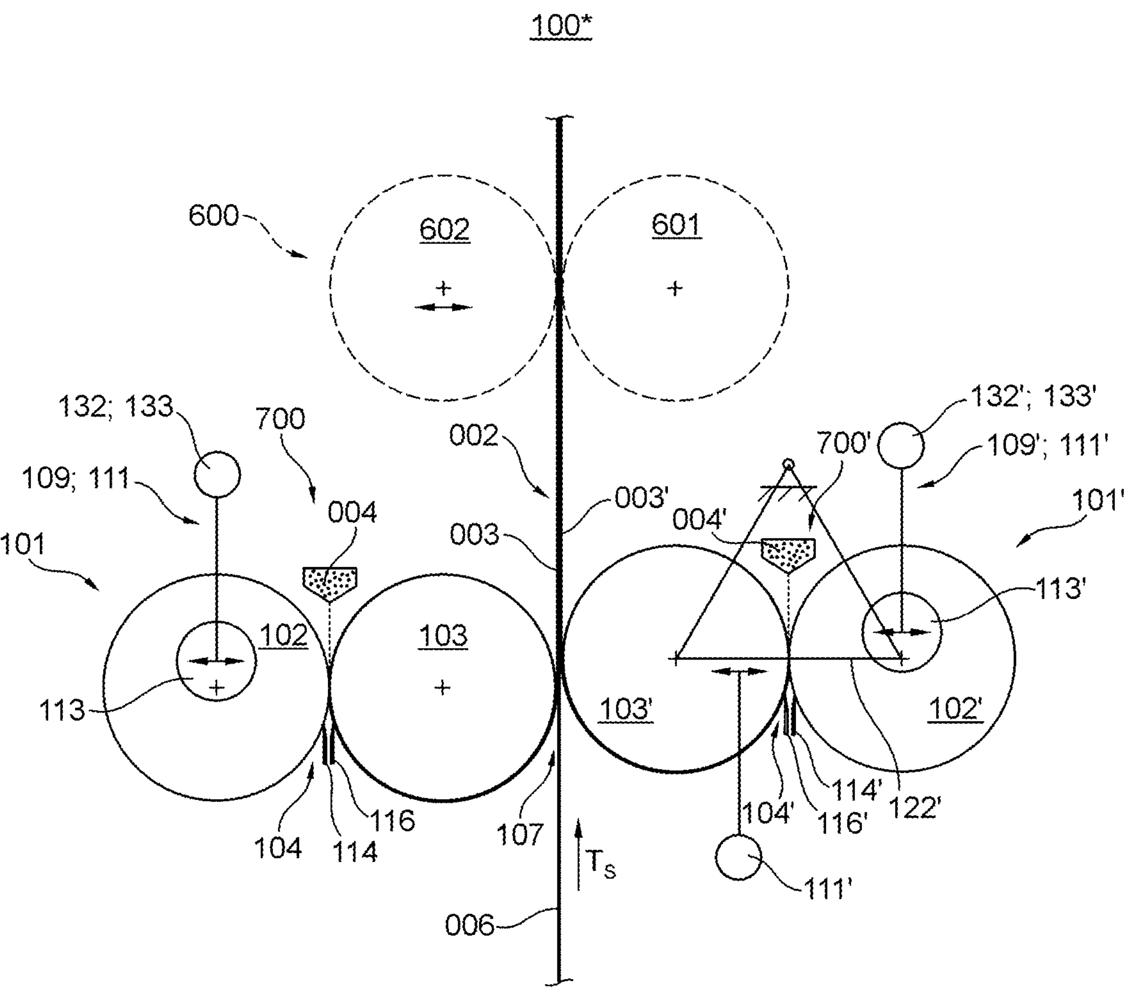
FIG. 12 an enlarged view of the application stage from FIG. 10 with the coupling of two rollers in pairs in a second design.
Figure 13:
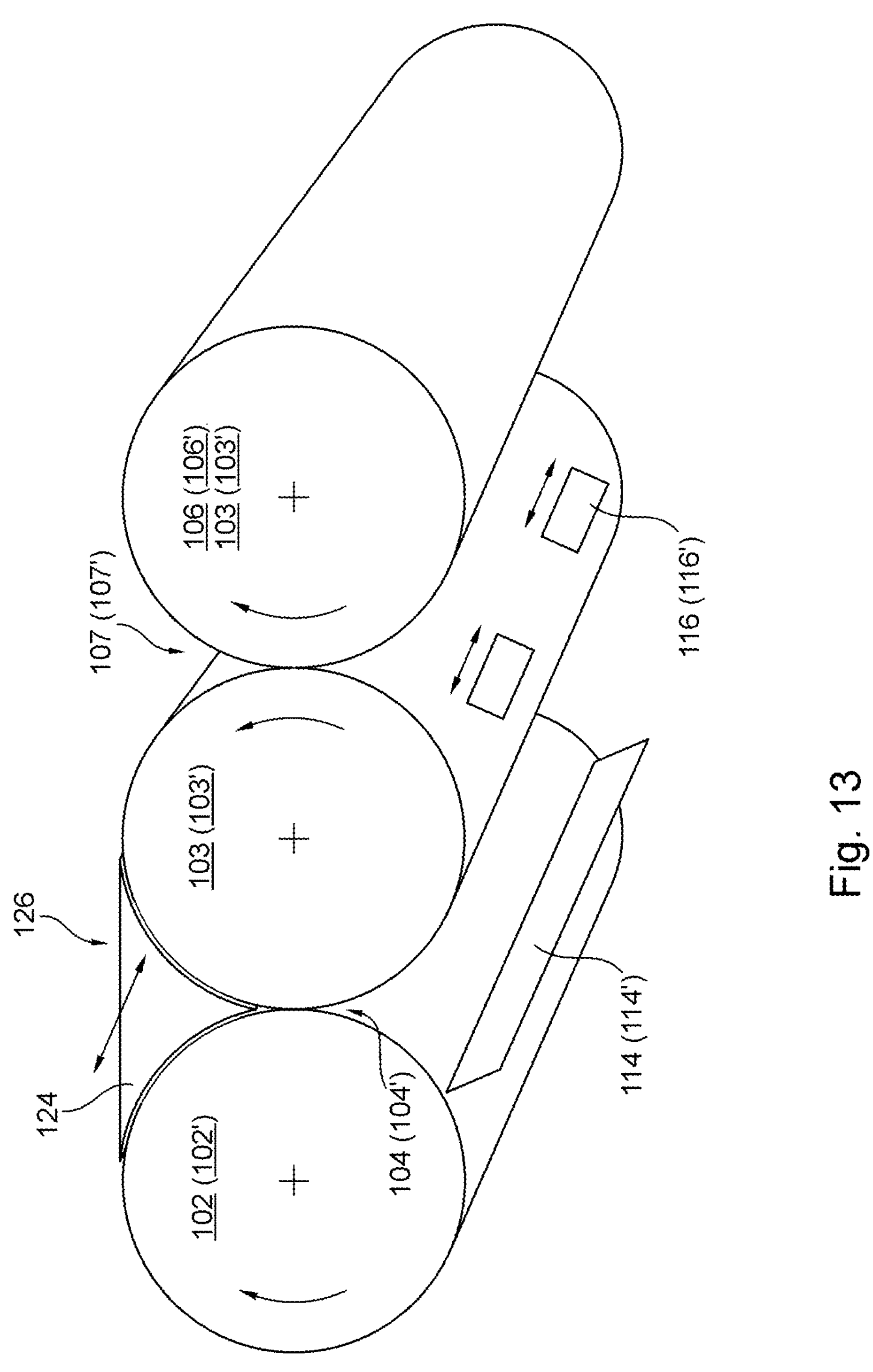
FIG. 13 a representation obliquely from beneath with removal devices.
Figure 14:
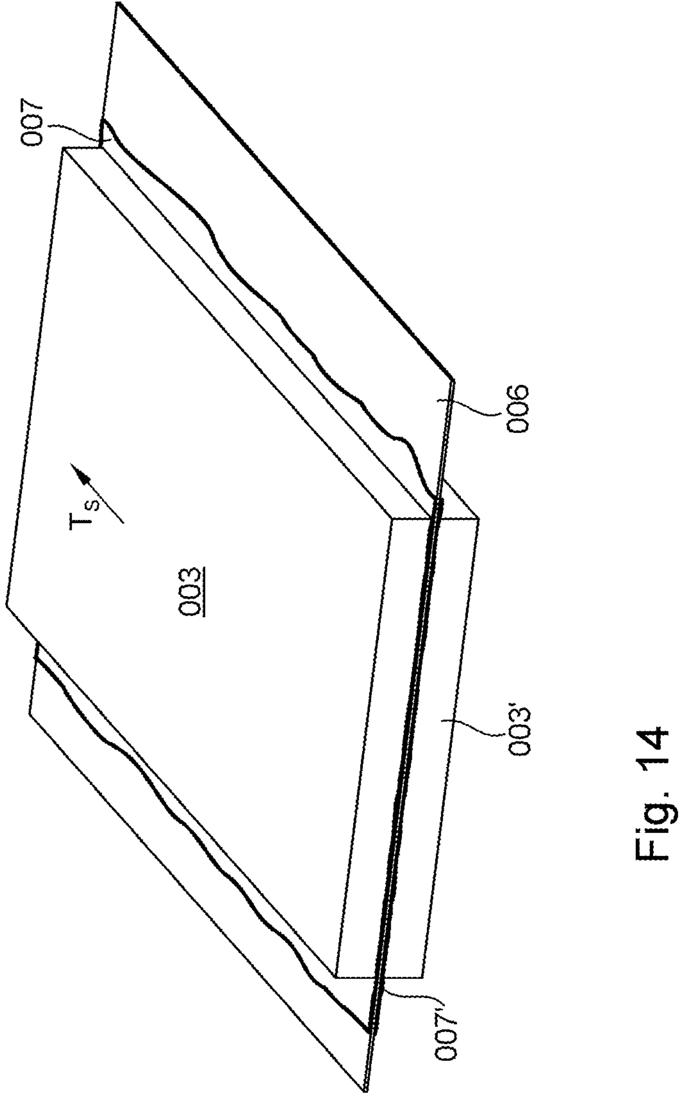
FIG. 14 an oblique view of a product section having a slight lateral primer protrusion.

As an alternative, the two jointly adjustable rollers 102; 103; 103'; 102', however, can be mounted on both sides in carriers, in particular in side parts of a subframe, which, in turn, are mounted so as to be pivotable about a pivot axis that is parallel to the axis of rotation of the first laminating roller 103; 103' mounted in a stationary manner (see, for example, FIG. 12).

As was already mentioned, at least one further roller, which is effective as a laminating roller and, together with the counter-pressure roller 106; 103', forms the laminating gap 107; 107', can be provided in a respective application unit 101; 101' between the second roller 103; 103' and the nip point for the counter-pressure roller 106; 103'.

For all embodiments of the two groups of exemplary embodiments, in a particularly advantageous refinement a removal device 114; 114', which is comprised, for example, by a material removal unit 127; 127' and, for cleaning purposes, can be selectively placed against and be removed from the outer cylindrical surface of the first roller 102; 102', in particular a cleaning squeegee 114; 114', is provided in the respective application unit 101; 101'. This removal device extends, for example, at least over the width of the cylindrical roller surface which is effective for forming the film.

Instead or advantageously in addition, the material removal unit 127; 127' in the respective application unit 101; 101', viewed axially parallel to the second roller 103; 103', comprises spaced apart from one another two axially parallel adjustable removal devices 116; 116', which can be placed against or removed from the second roller 103; 103', in particular a side edge squeegee 116; 116', by which a dry film 003; 003' that is conveyed over the second roller 103; 103' can be removed in the region of the lateral edges thereof and, for example, be transferred into a collecting device 117; 117'. This removal serves, for example, as a so-called trimming of the edge, to preserve a straight edge and/or a desired width b003; b003' of the dry film 003; 003'. The collected amount can, for example, be returned to the infeed of the powder mixture 004; 004'. Such a removal device 116; 116' can also be used to remove an edge strip 008; 008', which is used, for example, during the determination of a density of the material layer 003; 003'.

For cleaning purposes, a removal device 129; 129' that can be placed against and removed from the outer cylindrical surface of the second roller 103; 103', in particular a cleaning squeegee 129; 129', can also advantageously be provided, which, for example, extends at least over the width of the cylindrical roller surface which is effective for forming the film, and possibly an extraction or collecting device, which is not shown.

For feeding or introducing the powder mixture 004; 004' into the first gap 004; 004', an above-described powder feed device 700; 700' for feeding a powdered material is provided, wherein a filling and/or supply chamber 126 having a width extending in the axial direction of the second roller 103; 103' is formed and/or provided in the region of the wedge-shaped space above the gap 104; 104', that is, in the space that is formed above the gap 194; 104' between the outer cylindrical surfaces of the two rollers 102; 103; 102'; 103' and has an in particular wedge-shaped or triangular profile.

In a particularly advantageous design, two boundaries 124, which are spaced apart from one another axially parallel to the first roller 102; 102' and, for example, are adjustable in the axially parallel direction, in particular side shields 124, are provided in the application unit 101; 101' above the first gap 104; 104', which each seal off a region of the upper wedge-shaped space formed between the outer cylindrical surfaces of the first and second rollers 102; 103; 102'; 103' toward the two end faces of the application unit 101; 101', and in this way form an interposed filling and/or supply chamber 126, which preferably can be varied in terms of the width, for receiving the powder mixture 004; 004'. Depending on the desired width and/or position of the dry film 003; 003', the filling and/or supply chamber 126 can thus be varied or be variable on at least one side, preferably on both sides, in terms of the position of the lateral boundary 124 thereof. As an alternative to a filling and/or supply chamber 126 that is directly delimited by the outer cylindrical surfaces in the lower region, generally a filling and/or supply chamber 126 in the form of a filling or supply hopper could also be provided, at least where this does not contradict other design features of the application unit 101; 101' or of the powder feed unit 700; 700', for example in a manner comparable to an insertion aid described below, directly in or above the wedge-shaped space.

For all above-described embodiments, variants, configurations, specific embodiments or designs, the bearing mechanism 112; 112'; 113; 113' and/or the positioning drive 109; 109'; 111; 111' of the first roller 102; 102' is preferably designed in such a way that a gap width for the first gap 104; 104', during normal operation, can be set to a variable inside width at the narrowest point of at least 15 μm, advantageously of at least 30 μm, in particular of at least 50 μm, and/or that the gap width of the first gap 104; 104' can at least be set by way of above-described position-based drive means 132; 132' and/or by way of at least one-sided stop means 119 which delimit a throw-on position toward the nip point and the positions of which are adjustable, that is, for example an above-described in particular adjustable or positionable stop 119.

As an alternative or in addition, the bearing mechanism 112; 112'; 113; 113' and/or the positioning drive 109; 109'; 111; 111' are advantageously designed to set and/or apply, in the first gap 104; 104' at least in the region of the width thereof contributing to the film formation, a linear force of, for example, at least 500 N/mm, advantageously at least 700 N/mm, preferably a linear force ranging between 500 N/mm and 3000 N/mm, between the rollers 102; 102'; 103; 103' forming the first gap 104; 104'.

As mentioned above, a combined positioning mechanism 112; 113; 112; 113 can be provided for throwing the metering roller 102; 102' on the second roller 103; 103', for example in an above embodiment and/or within the above meaning, which selectively, for example in one operating mode, allows a position-based adjustment by way of a position-based positioning drive 109; 109' and, for example in a second operating mode, allows a force-based adjustment by way of a force-based positioning drive 111; 111'.

For all above-described embodiments, variants, configurations, specific embodiments or designs and, for example, independently of the above-described implementation of the coating device 100; 100* comprising individual application units 101; 101' with respective counter-pressure rollers 106; 106 or comprising combined application units 101; 101' with counter-pressure rollers 103'; 103 that are effective with respect to one another, in a particularly advantageous embodiment the metering gap 104; 104' between the first and second rollers 102; 102'; 103; 103' can be adjusted based on a position-based positioning drive 109; 109' within the above meaning, which can be positioned, for example, with respect to a predefined position or is position-controlled by open loop control or position-controlled by closed loop control, for example can be positioned with respect to the gap width, can be controlled by open loop control, for example, via an open loop control system or can be controlled by closed loop control, for example, via a closed loop control circuit, that is, for example, can be set to a constant and/or defined gap width 104', for example can be positioned, controlled by open loop control or controlled by closed loop control, wherein the position-based adjustment is directed at a relative position or gap width 104 of the two rollers 102; 103; 102' 103', which is to be defined and maintained at a constant level, in the working positions thereof, and/or the laminating gap 107; 107' between the second roller 103; 103' and the counter-pressure roller 106; 106'; 103'; 103 can be adjusted within the above meaning based on a force-based, for example, force-controlled by open loop control or force-controlled by closed loop controlled, positioning drive 111; 111', for example can be controlled by open loop control with respect to the adjustment force via, for example, a pressure control valve or, for example, a controlled system comprising, for example, such a pressure control valve or, for example, can be controlled by closed loop control via, for example, a controlled system comprising such a pressure control valve, that is, can be set, for example, to a constant and/or defined contact force or linear force, for example can be controlled by open loop control or controlled by close loop control, wherein the force-based adjustment is in particular directed at a contact force or linear force, which is defined and/or to be maintained at a constant level, between the two rollers 106; 106'; 103'; 103 involved in the second gap 107; 107' in the working position thereof. It shall be noted only for clarification purposes that the linear force or contact force effective between the two rollers 106; 106'; 103'; 103 involved in the second gap 107; 107', in particular, does not act directly, but via the material that is guided through the gap, in the case of the film-forming gap 104; 104', for example, via the powdered material 004; 004', and in the case of the laminating gap 107; 107' via the product strand 002 comprising the dry film 007 on one side or both sides.

Without limiting the above-described specific exemplary embodiments, generally any of the two rollers 102; 102'; 103; 103'; 106; 106' involved in the relevant gap 104; 104'; 107; 107' can be mounted so as to be adjustable by the corresponding positioning drive 109; 109'; 111; 111' and/or at corresponding positioning mechanisms 112; 112'; 113; 113' within the above meaning. This also applies to embodiments in which one of the rollers 102; 102'; 103; 103'; 106; 106' that is involved in the relevant gap 104; 104'; 107; 107', together with another roller 102; 102'; 103; 103'; 106; 106' that is not involved in this gap 104; 104'; 107; 107', are mounted so as to be jointly adjustable in this manner.

Likewise, for example, independently of the above-described implementation of the coating device 100; 100* comprising individual application units 101; 101' with respective counter-pressure rollers 106; 106 or comprising combined application units 101; 101' with counter-pressure rollers 103'; 103 that are effective with respect to one another, in a particularly advantageous embodiment with respect to the optimal adjustability the metering gap 104; 104' between the first and second rollers 102; 102'; 103; 103' of the same application unit 101; 101' and/or the laminating gap 107; 107' between the second roller 103; 103' and the cooperating counter-pressure roller 106; 106; 103'; 103, is designed so as to be adjustable, for example not just merely in a position-based or force-based manner but, based on a combined positioning drive 109; 109'; 111; 111' selectively, in particular within the above meaning, in a position-based manner, for example so as to be positionable in terms of the gap width, so as to be controllable by, for example, open loop control via an open loop control system or so as to be controllable, for example, by closed loop control via a closed loop control circuit, that is, so as to be adjustable in, for example, one operating mode to a constant and/or defined relative position of the two rollers and/or a constant and/or defined gap width, for example positionable or controllable by open loop control or controllable by closed loop control, or so as to be adjustable in, for example, another operating mode in a force-based manner, for example so as to be controllable by open loop control in terms of the adjustment force via, for example, a pressure control valve or, for example, a controlled system comprising, for example, such a pressure control valve or, for example, so as to be controllable by closed loop control via a controlled system comprising such a pressure control valve, that is, is designed so as to be settable in, for example, another operating mode to a defined and/or constant contact force or linear force, for example, so as to be controllable by open loop control or controllable by closed loop control. In particular a roller 102; 102'; 103; 103'; 106; 106' that is involved in the relevant gap 104; 104'; 107; 107' is mounted in a combined positioning mechanism 112; 113; 112; 113 so as to be selectively adjustable in a position-based or force-based manner and/or the relevant gap 104; 104'; 107; 107' can be selectively set within the above meaning to a constant and/or defined gap width or to a constant and/or defined contact force or linear force, in particular controlled by open loop control or controlled by closed loop control within the above meaning. Without limiting the above-described specific exemplary embodiments, here as well generally any of the two rollers 102; 102'; 103; 103'; 106; 106' involved in the relevant gap 104; 104'; 107; 107' can be adjustable by the corresponding combined positioning drive 109; 109'; 111; 111' and/or can be accordingly mounted at corresponding combined positioning mechanisms 112; 112'; 113; 113' within the above meaning. This also applies to embodiments in which a roller 102; 102'; 103; 103'; 106; 106' that is involved in the relevant gap 104; 104'; 107; 107', together with another roller 102; 102'; 103; 103'; 106; 106' that is not involved in this gap 104; 104'; 107; 107', are mounted so as to be jointly adjustable in this manner.

In an advantageous embodiment, the combined positioning drive 109; 109'; 111; 111' is formed by a force-based, in particular force-controllable by open loop control or force-controllable by closed loop control, positioning drive 111; 111' comprising a positioning mechanism 113; 113'; 112; 112', in the adjustment path of which selectively a stop 119, which can be positioned, for example, by way of drive and/or positioning means 145; 146, can be introduced for limiting the position. Preferably, a cylinder-piston system 133 actuatable using pressurized medium, in particular hydraulically, is provided as the drive means 133.

For the adjustment, the first roller 102; 102' can be mounted so as to be adjustable in a direction having at least one movement component toward the respective assigned second roller 103; 103' and/or away therefrom by way of a bearing mechanism 113; 113'; 112; 112' and/or a, for example position-based or force-based or selectively position-based or force-based positioning drive 109; 109'; 111; 111'. In addition or instead, the counter-pressure roller 106; 106'; 103'; 103 can be mounted so as to be adjustable in a direction having at least one movement component toward the second or an interposed further roller 103; 103' and/or away therefrom by way of a bearing mechanism 113; 113'; 112; 112' and/or a, for example position-based or force-based or selectively position-based or force-based positioning drive 109; 109'; 111; 111'.

As an alternative, the first roller 103; 103', together with the assigned second roller 102; 102', can be mounted so as to be movable in pairs in a direction having at least one movement component toward the assigned counter-pressure roller 106; 106' and/or away therefrom by way of a shared bearing mechanism 112; 112'; 113; 113' and/or a shared, for example, position-based or force-based or selectively position-based or force-based positioning drive 109; 109'; 111; 111', and additionally the respective first roller 102; 102' can be mounted so as to be adjustable in a direction having at least one movement component toward the respective assigned second roller 103; 103' and/or away therefrom by way of a bearing mechanism 113; 113'; 112; 112' and/or a, for example, position-based or force-based or selectively position-based or force-based positioning drive 109; 109'; 111; 111'.

For all above-described embodiments, variants, configurations, specific embodiments or designs, the first roller 102; 102' and the second roller 103; 103' forming the first gap 104; 104' therewith can be rotationally driven or are rotationally driven mechanically independently of one another during normal operation in opposite directions and at differing circumferential speeds and/or by differing drive means 148; 149, for example drive motors 148; 149, in particular at least speed-controllable, by closed-loop or open-loop control, servo motors.

In the process, the first roller 102; 102' is operated at a lower speed, wherein the first roller 102; 102', in particular the metering roller 102; 102', and the assigned second roller 103; 103', in particular the laminating roller 103; 103', during normal operation, can be operated or are operated, for example, at a ratio V102(102'):V103(103') of the circumferential speed of the first to the second roller 102, 102'; 103; 103' which is in a range of 1:5 to 3:5, in particular 1:4.

During normal operation, the rollers 103; 106; 103; 103' forming the second gap 107; 107' with one another are preferably drivable or driven mechanically independently of one another at the same circumferential speed by a shared drive motor 148, in particular servo motor, or preferably by differing drive motors 148, in particular servo motors 148.

In an advantageous embodiment, the drive motors 148; 149 that are mechanically independent of one another can be operated via an electronic, in particular virtual master axis by a drive controller.

Of particular advantage is a refinement in which the first roller 102; 102', in the region of the outer cylindrical surface thereof contributing to the film formation, has a stronger material-repellent surface with respect to the powder mixture and/or a less strongly adhesively acting outer cylindrical surface than the second roller 103; 103' in the region of the outer cylindrical surface contributing to the film formation.

At least the second roller 102; 102'; 103; 103' can have a polished and/or chrome-plated or ceramic-coated surface, at least in the region of the outer cylindrical surface contributing to the film formation. The first roller 102; 102' can have a structured or material-repellent surface, at least in the region of the outer cylindrical surface contributing to the film formation.

For all above-described embodiments, variants, configurations, specific embodiments or designs, the first and/or the second rollers 102; 102; 103; 103' can be temperature-controlled, in particular heated, preferably in such a way that the outer cylindrical surface thereof can be heated, for example at an ambient temperature of 25° C., to at least 80° C., advantageously to at least 100° C., preferably to at least 120° C.

Instead or preferably in addition, the roller 106; 106' of the first group of exemplary embodiments which is only effective as a counter-pressure roller 106; 106'; 103; 103 is temperature-controllable, in particular heatable, preferably in such a way that the outer cylindrical surface thereof can be heated, for example at an ambient temperature of 25° C., to at least 80° C., advantageously to at least 100° C., preferably to at least 120° C.

The temperature control or heating can generally be carried out electrically, however in an advantageous embodiment is implemented by conducting a temperature-control or heating fluid through the roller 102; 102'; 103; 103'; 106; 106' of which the temperature is to be controlled. In the process, the temperature control fluid, for example accordingly temperature-controlled water, is supplied to and removed from the roller 102; 102'; 103; 103'; 106; 106' of which the temperature is to be controlled via a temperature-control fluid line 134 and, for example, a rotary union in the relevant roller 102; 102'; 103; 103'; 106; 106'.

For all above-described embodiments, variants, configurations, specific embodiments or designs, the two application units 101; 101' are mounted together with one or more substrate guide elements 121, which may be arranged directly upstream, downstream or therebetween, in a shared or possibly multi-piece frame 128, for example, two end-face frame walls 131 of the same or possibly multi-piece frame 128. In the case of a shared frame 128 having one-piece frame walls 131, a particularly rigid arrangement of the application units 101; 101' can be provided in a laminating unit 100; 100* designed as a subassembly 100; 100*, for example laminating subassembly 100:100*.

If, for example, a calendering unit 600; 600*, which is described below, for example, and also referred to as a calender 600; 600*, is provided in the substrate path, for example directly, downstream from the laminating unit 100; 100*, in an advantageous refinement rollers 601; 601'; 602; 602* comprised by the calendering unit 600; 600* can likewise be mounted in this frame 603 or, in an advantageous variant, for example, as a separate subassembly 600; 600*, for example calendering subassembly 600; 600*, in side walls of a dedicated frame 603 that is arranged directly on and/or above the frame 128 carrying the application units 101; 101'.

Figure 15:
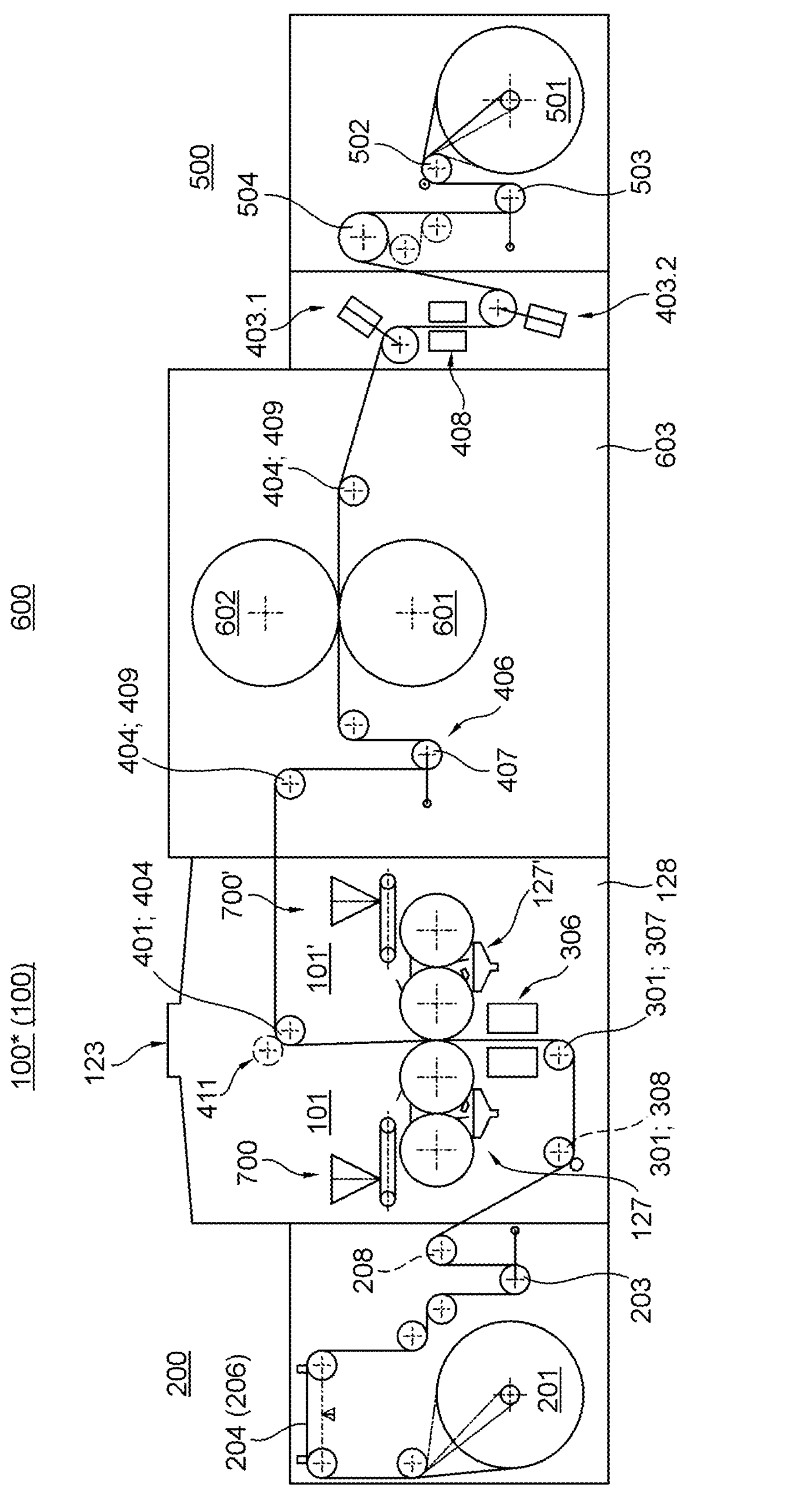
FIG. 15 another exemplary embodiment of a machine for producing a multi-layer product including a dry film that is applied to a carrier substrate with an application stage according to one embodiment of the second group of exemplary embodiments.
Figure 16:
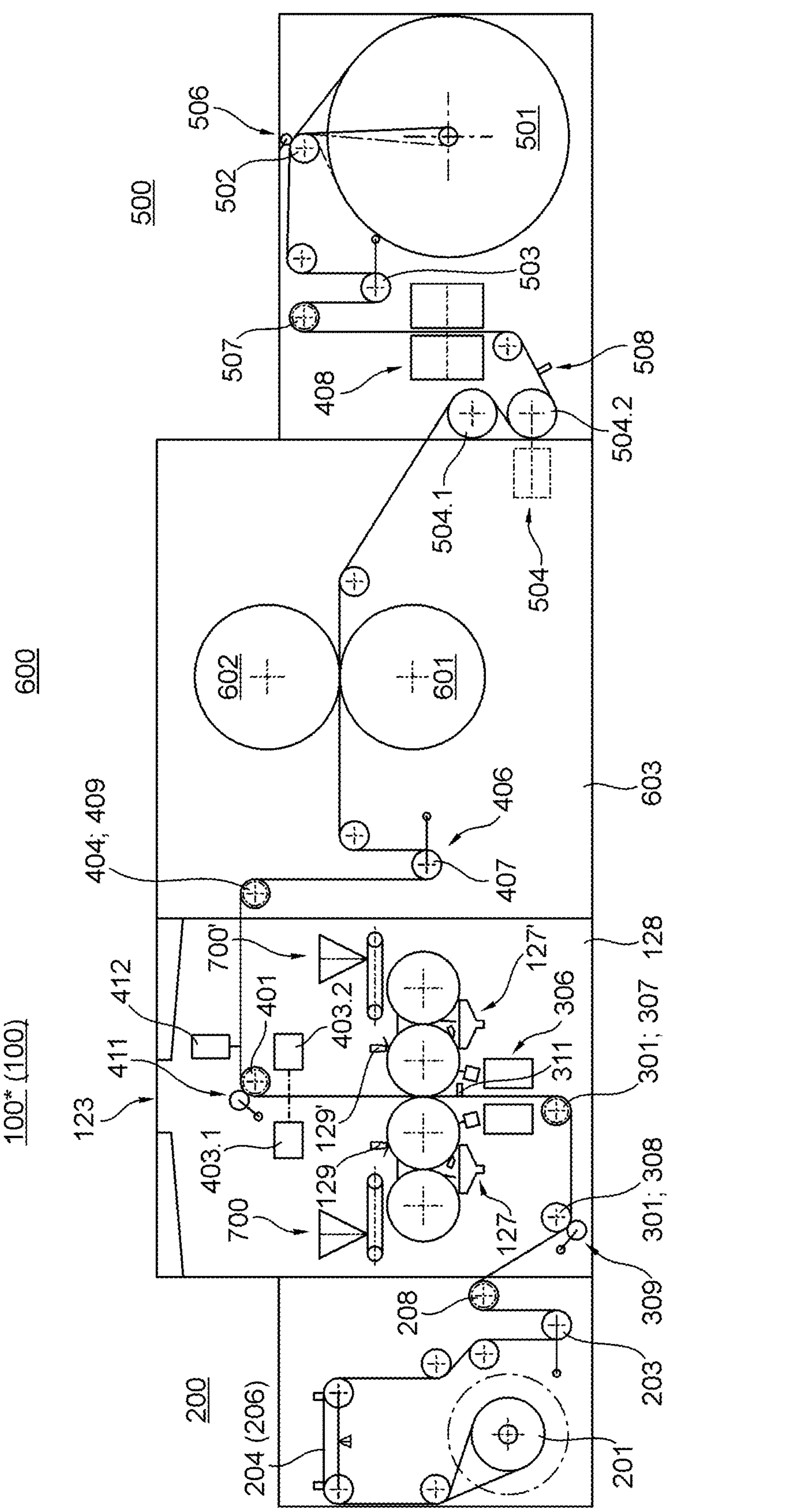
FIG. 16 another exemplary embodiment of a machine for producing a multi-layer product including a dry film that is applied to a carrier substrate with an application stage according to one embodiment of the second group of exemplary embodiments.

In an embodiment of the machine shown, for example, in FIG. 15 and FIG. 16, which may have a slightly longer design, in which, however, the risk of transmitting vibrations between the subassemblies 100; 100*; 600; 600*, in particular at least the laminating subassembly 100; 100* and the calendering subassembly 600; 600*, for example, is decreased, the laminating subassembly 100; 100* and the calendering subassembly 600 provided there are provided horizontally next to one another, preferably even in dedicated frames 128; 603, which, for example, are separated from one another in terms of vibration. In a variant of FIG. 3, FIG. 10, FIG. 15 and/or FIG. 16, which is not shown, the calendering subassembly 600; 600* can also be dispensed with.

A calendering subassembly 600; 600* shown, for example, in FIG. 15 and FIG. 16 or a calendering step additionally provided downstream from the application of the dry film 003; 003*, however, is not mandatory and may also be entirely dispensed with in another embodiment of the machine for coating. In the latter case, a calendering step may then be entirely dispensed with or be performed or performable in a separate process and/or a separate, for example second, machine. The second machine comprises, for example on the input-side, a substrate unwinder, from which the web-format intermediate product 002 can be unwound and guided along a substrate path through at least one calendering unit 600 up to an output-side roll winder or via a cross-cutting device to a delivery unit.

Generally independently of, but advantageously in conjunction with one of the above-described embodiments, variants, configurations, specific embodiments or designs of the application units 101; 101' and/or coating devices 100; 100* and/or machine configurations, the frame 128 of the device for coating 100; 100 has a multi-piece design in a particularly advantageous embodiment (see, for example, FIG. 17, FIG. 18, FIG. 19, FIG. 20, and FIG. 21). At least two adjacent rollers 102; 103; 102'; 103'; 106 of the application unit 101; 101', in an advantageous embodiment at least the two rollers 103; 103'; 106 that form the laminating gap 107; 107' with one another and/or are effective as counter-pressure rollers 103; 103'; 106 are mounted on both sides in, in particular rigidly connected, frame walls 131.1; 131.2; 131.3; 131.4 of two different frame sections 128.1; 128.2; 128.3; 128.4, which in the relative position thereof are arranged so as to be able to vary the position thereof relative to one another along an adjustment direction extending perpendicular to the axis of rotation R102; R103; R102'; R103'; R106; R106' of at least one of the two adjacent rollers 102; 103; 102'; 103'; 106 in such a way that a distance between the outer cylindrical surfaces thereof or axis of rotation R102; R103; R102'; R103'; R106; R106' and/or a contact force that is effective between the outer cylindrical surfaces of two adjacent rollers 102; 103; 102'; 103'; 106, for example, via a carrier substrate 006 that is acted-on or coated on at least one side or via the powdered material 004; 004', can be varied or adjusted. In a preferred variant, one of the two frame sections 128.1; 128.2; 128.3; 128.4 can be arranged in a spatially fixed manner, for example, on a platform of the coating device 100; 100* or in or on a higher-level frame structure 145, for example a base plate 145, fixed to the frame, and the other of the at least two frame sections 128.1; 128.2; 128.3; 128.4 can be adjustable via a bearing mechanism 112; 113 within at least one adjustment range along the relevant adjustment direction, and in another variant, both the one and the other of the adjacent frame sections 128.1; 128.2; 128.3; 128.4 can be adjustable along the adjustment direction. The frame sections 128.1; 128.2; 128.3; 128.4 each comprise in particular two frame walls 131.1; 131.2; 131.3; 131.4, which are rigidly, even though possibly detachably, connected to one another via one or more cross-connections, for example one or more crossbars 136; 137. A movement of a frame section 128.1; 128.2; 128.3; 128.4 that is adjustable in the above manner can thus take place as a whole, including the roller 102; 103; 102'; 103'; 106 or rollers 102; 103; 102'; 103'; 106 carried by the same.

In an above-described embodiment of an application unit 101 for only a one-sided application, that is, comprising a first roller 102, for example the metering roller 102, a second roller 103, for example the laminating roller 103, and a pure counter-pressure roller 106, it is possible in a first variant embodiment, which, however, is not shown, for example, for the first and second rollers 102; 103 to be mounted together in or on frame walls 131.1 of a first frame section 128.1, and the counter-pressure roller 106 can be mounted in or on frame walls 131.2 of a second frame section 128.2. For this purpose, for example, the first roller 102 is mounted in or on the first frame section 128.1 so as to be adjustable in the contact force thereof or in the distance thereof with respect to the second roller 103 via above-described positioning means 109; 111 in a force-based manner, for example within the above meaning force-based, force-controlled by open loop control or force-controlled by closed loop control, and/or in a position-based manner, for example within the above meaning positionable, position-controlled by open loop control or position-controlled by closed loop control (with the "and" variant in the 'and/or' expression here denoting a selectively force-based or position-based adjustable combined positioning drive). In an alternative variant, for example, the second roller 102; 103 and the counter-pressure roller 106 are mounted in or on frame walls 131.1 of a first frame section 128.1 and the first roller 102, for example metering roller 102, is mounted on frame walls 131.3 of a separate frame section 128.3. For this purpose, for example, the counter-pressure roller 106 is mounted in or on the first frame section 128.1 so as to be adjustable in the distance thereof with respect to the second roller 103 via above-described positioning means 109; 111 in a force-based manner, for example, force-defined, force-controlled by open loop control or force-controlled by closed loop control, and/or in a position-based manner, for example, positionable, position-controlled by open loop control or position-controlled by closed loop control.

In a preferred variant of an above-described embodiment of an application unit 101 for only a one-sided application, the first, the second and the counter-pressure rollers 102; 103; 106 are mounted in or on frame walls 131.1; 131.2; 131.3 of a respective dedicated frame section 128.1; 128.2; 128.3. For example, one of the frame sections 128.1; 128.2; 128.3, preferably the frame section 128.2 carrying the second roller 103, is arranged so as to be fixed in space or fixed to the frame, and the two other frame sections 128.1, 128.2, 128.3 are mounted so as to be movable relative thereto along the adjustment direction. For example in FIG. 18, for example the right frame section 128.4 including a frame wall 131.4 and the roller 102' may be dispensed with for this embodiment, wherein the roller 103' is then designed as a pure counter-pressure roller 106.

In a preferred embodiment of the application unit 101; 101' in the form of a double application unit 101; 101' for the simultaneous two-sided application, which is shown, for example, in FIGS. 8 to 12 and FIG. 15, FIG. 16 and FIG. 17 and FIG. 18, in a first variant, which is not shown, the two roller pairs made up of metering and laminating rollers 102; 103; 102'; 103' can be mounted in pairs in a respective frame section 128.1, 128.2, wherein the two frame sections 128.1, 128.2 are able to vary the position thereof with respect to one another in the above-described manner in such a way that a distance between the axes of rotation R103; R103' of the two rollers 103; 103' forming the laminating gap 107 with one another and/or a contact force that is indirectly or directly effective between the outer cylindrical surfaces can be varied. One of the frame sections 128.1; 128.2 can be fixed in space or fixed to the frame, and the other can be mounted so as to be movable in the adjustment direction. The metering rollers 102; 102' are, for example, mounted in the particular frame section 128.1; 128.2 via above-described positioning means 109; 111 in a force-based manner, for example, force-defined, force-controlled by open loop control or force-controlled by closed loop control, and/or in a position-based manner, for example, positionable, position-controlled by open loop control or position-controlled by closed loop control, so as to be adjustable in the distance with respect to the respective adjacent laminating roller 103. In an alternative variant, which is likewise not shown, the roller pair 103; 103' forming the laminating gap 107; 107' can be mounted in a first, shared frame section 128.1, and the two metering rollers 102; 102' can each be mounted in a dedicated frame section 128.3; 128.4, wherein the first frame section 128.2 is, for example, fixed in space or fixed to the frame, and the two other frame sections 128.3; 128.4 are movable relative to the first frame section 128.1 in such a way that, in the above-described manner, a distance between the axes of rotation R102; R103; R102'; R103' in each case between the first and second rollers 102; 103; 102'; 103' and/or a contact force that is indirectly or directly effective between the outer cylindrical surfaces can be varied. One of the laminating rollers 103; 103' can be mounted so as to be adjustable via above-described positioning means 109; 111 in a force-based manner, for example, force-defined, force-controlled by open loop control or force-controlled by closed loop control, and/or in a position-based manner, for example, positionable, position-controlled by open loop control or position-controlled by closed loop control, in the distance with respect to the other laminating roller 103.

In a preferred embodiment of the application unit 101; 101' in the form of a double application unit 101; 101' for the simultaneous two-sided application, however, all four or, in the case of, for example, further intermediate rollers, all rollers 102; 103; 102'; 103' are mounted in frame walls 131.1; 131.2; 131.3; 131.4 of respective dedicated frame sections 128.1; 128.2; 128.3; 128.4. For example, one of the frame sections 128.1; 128.2; 128.3; 128.4, preferably a frame section 128.1 carrying a second or laminating roller 103, in particular the laminating roller 103 of the first application unit 101, is arranged so as to be fixed in space or fixed to the frame, and the remaining frame sections 128.2; 128.3; 128.4 are mounted so as to be adjustable along an adjustment direction that preferably extends perpendicular to an axis of rotation R103; 103' of a laminating roller 103; 103', in particular the laminating roller 103 that is mounted so as to be fixed in space or fixed to the frame, and/or horizontally.

Preferably, at least the roller 102 of the first application unit 101 which is the first roller and/or follows upstream, with respect to the material stream, from the roller 103 of the first application unit 101 that is involved in the formation of the second gap 107; 107' is mounted in or on a third frame section 128.3, which can be displaced along an adjustment direction extending perpendicular to the axis of rotation R102; R103; R102'; R103'; R106; R106' of at least the roller 103 of the first application unit 101 that is involved in the formation of the second gap 107. If a double application unit 101; 101' is present, in an advantageous embodiment additionally the roller 102 of the second application unit 101' which follows upstream, with respect to the material stream, from laminating roller 103' of the second application unit 101' that is involved in the formation of the second gap 107; 107', in particular the first roller, is mounted in or on a fourth frame section 128.4, which can be displaced along an adjustment direction extending perpendicular at least to the axis of rotation R103 of the roller 103 mounted in or on the frame section 128.1 that is fixed in space or fixed to the frame.

For all described embodiments comprising movable frame sections 128.2; 128.3; 128.4, these can preferably be moved on linear guides 112; 112', wherein dedicated guide sections 138, for example rail portions 138, can be provided for each of the movable frame sections 128.2; 128.3; 128.4, or continuous guides 138 or rails 138 can be provided for two or more displaceable adjacent frame sections 128.2; 128.4. The frame sections 128.2; 128.3; 128.4 can comprise support feet 139 on the bottom side, which are designed so as to correspond to the guide sections 138 or guides 138 and, for example, comprise sliding or roller bodies. The rollers

102; 102'; 103; 103'; 106 can generally be mounted so as to be rotatable on a respective axis that is rotationally fixed in the frame walls 131.1; 131.2; 131.3; 131.4 of the respective frame sections 128.1; 128.2; 128.3; 128.4 via corresponding bearings 151 or, advantageously, as is shown in FIG. 17 to FIG. 21, by way of end-face roller journals in bearings 151, in particular radial bearings 151, which in turn are arranged in or on the relevant frame walls 131.1; 131.2; 131.3; 131.4.

The mutually adjacent frame sections 128.1; 128.2; 128.3; 128.4 arranged so as to be movable relative to one another, in the preferred embodiment here, can be moved toward one another, in particular can be tensioned, and moved away from one another again or at least be relaxed again on each frame side by at least one drive means 132; 132'; 133; 133', in particular by at least one adjustment device 141 comprising a drive means 132; 132'; 133; 133', and possibly via further means transmitting the adjusting movement or force, on each frame side, preferably by two or at least two adjustment devices 141, in particular drawing devices 141, for example in the manner of tensioning devices 141, on each frame side in the adjustment direction. The drawing devices 141 can be designed so as to be able apply not only an above-described tensile force, but, if needed, also a force that is directed in the opposite direction and/or moves the frame sections 128.1; 128.2; 128.3; 128.4 away from one another, for example, pressure force that is effective between the frame sections 128.1; 128.2; 128.3; 128.4. The mutually facing sides of the adjacent frame sections 128.1; 128.2; 128.3; 128.4 that are arranged so as to be movable relative to one another are, for example, designed to correspond to one another in such a way that the adjacent rollers 102; 103; 103; 103'; 106 carried by the frame sections 128.1; 128.2; 128.3; 128.4, for example with accordingly placed stop means 119, can be brought with the effective outer cylindrical surfaces thereof into a relative position desired for operation, possibly having a desired gap width or a gap width arising as a result of the load.

In an advantageous embodiment of such an application unit 101; 101' comprising a multi-piece frame 128, at least one positioning drive 109; 109' effectuating the adjustment, for example, the variation of the position and/or of the contact force between the first and second rollers 102; 103; 102'; 103' and comprising a drive means 132; 133 is designed in a position-based manner, for example, positionable, position-controlled by open loop control or position-controlled by closed loop control, or, in a particularly advantageous embodiment, can selectively be operated in a position-based manner, for example force-defined, force-controlled by open loop control or force-controlled by closed loop control, or in a position-based manner, for example, positionable, position-controlled by open loop control or position-controlled by closed loop control.

For example, the drive means 133 that is provided is a drive means 133 that engages on the frame section 128.3; 128.4 carrying the first roller 102; 102' and on the frame section 128.1; 128.2 carrying the second roller 103; 103'; 106 and can be operated or is operated in a force-based manner, in particular can be operated or is operated force-controlled by open loop control or force-controlled by closed loop control, in particular a piston-cylinder system 133 that can be acted on by pressurized fluid, in particular hydraulically, as well as at least one stop means 119 that is effective between the frame section 128.3; 128.4 carrying the first roller 102; 102' and the frame section 128.1; 128.2 carrying the second roller 103; 103'; 106 and, for example, can be set or adjusted via positioning and/or drive means 146 and/or by a servo motor, and possibly, for example, can be controlled by open loop control or controlled by closed loop control in the stop action thereof, which can, for example, be introduced into the adjustment path selectively and/or so as to be substantially path-limiting. The stop means 119 that is provided can generally be an arbitrary, preferably settable stop means 119, by way of which a throwing-on movement between the two relevant frame sections 128.1; 128.2; 128.3; 128.4 can be limited and preferably be set in terms of the end position. These can be, for example, one or more stops 119 based on a particular screw thread, which can be brought into a desired position, in particular can be rotated, manually or by way of a remotely actuatable positioning and/or drive means 146, possibly by way of a gear and/or by a servo motor. In an embodiment that is preferred here, stop means 119 that are based on a wedge gear are provided as stop means 119, for example, bars having a wedge-shaped design in opposite directions are, for example, provided as stops 119, which cooperate in pairs with mutually opposing sides and have a thickness that varies in opposite directions. For the adjustment, it is sufficient when, for example, one of the wedge-shaped bars can be displaced by a suitable positioning and/or drive means 146, for example a motor-driven positioning drive 146 that is formed, for example, by a screw drive, or a motor-driven toothed rack that is displaced or can be displaced in the longitudinal direction of the bar pair against the other. If the length of the cooperating sides is large and there is a small gradient in the thickness, it is possible to achieve a very fine variation of the end position to be defined by the stop means 119 when using such stop means 119.

In an advantageous embodiment, at least one positioning drive 109; 109' that effectuates the variation and/or the contact force between the two rollers 103; 103'; 106; 106' forming the second nip 107; 107' between each other and that comprises a drive means 132; 133 is designed to be force-based or, in a particularly advantageous embodiment, can selectively be operated in a force-based or position-based manner. For example, the drive means 133 that is provided is a drive means 133 that indirectly or directly engages on the two frame sections 128.1; 128.2, which carry the rollers 103; 103'; 106; 106' that form the second nip 107; 107' between each other, and can be operated or is operated in a force-based manner, in particular can be operated or is operated force-controlled by open loop control or force-controlled by closed loop control, in particular a piston-cylinder system 133 that can be acted on by pressurized fluid, preferably hydraulically, as well as at least one stop means 119 that is effective between these two frame sections 128.1; 128.2 and can be set via positioning and/or drive means 146. The stop means 119 can be designed in a manner described above, or deviating therefrom, but at least so as to be adjustable, for example controllable by open loop control or controllable by closed loop control, in the stop action thereof.

The drive means 133 can engage indirectly or directly on the relevant two adjacent frame sections 128.1, 128.2; 128.3, 128.4 in that in each case one active-side end of the drive means 132; 133, for example the piston or the piston rod 142 extending the same, for example of a cylinder-piston system 132; 133 which can be acted on by pressurized fluid, in particular hydraulically, on the one hand and/or an end of the cylinder on the other hand is connected, for example directly, to the particular frame section 128.1, 128.2; 128.3, 128.4. However, a connection can also be implemented indirectly, for example via further means transmitting the adjustment movement and/or the adjustment force, for example a one-piece or multi-piece transmitting member, for example in the manner of a pull and/or push rod, which can be subjected to tensile stress and/or compressive stress and extends or continues the piston or the piston rod 142 on the one hand and/or possibly the cylinder on the other hand. The respective connection of the adjustment device 141 comprising the drive means 133 or directly of the drive means 133 themselves, for example via compression and/or tension plates 143; 144, within the present meaning determines an engagement surface for the action of the drive means 132; 133. The two active-side ends of the adjustment device 141 or of the drive means 133 comprised thereby are preferably connected to the respective frame sections 128.1, 128.2; 128.3, 128.4, viewed in the adjustment direction, not only in a tension-proof, but also compression-proof manner. In addition to enabling a movement toward one another, this also enables an active movement away from one another.

In a preferred embodiment, at least one adjustment device 141 which comprises a drive means 132; 133 and effectuates a relative adjustment movement and/or tensile force between the two frame sections 128.2; 128.3, 128.4, in particular an above-described drawing device 141, for example in the manner of a tensioning device 141, engages between two respective frame sections 128.1, 128.2; 128.3, 128.4 on the frame sections 128.1, 128.2; 128.3, 128.4 so as bring the two rollers 102; 103; 103'; 103' or the mutually adjacent frame sections 128.1, 128.2; 128.3, 128.4 into a relative position or throw-on position as it relates to a predefined gap width and/or contact force by way of a force that, between the frame sections 128.1, 128.2; 128.3, 128.4, is directed toward each other and maintain these at a constant level, possibly against a force that is directed counter to the throwing-on direction by the powdered material 004 or the coated carrier substrate 006, with this relative position or contact force, with the exception of a deviating specification with respect to the relative position and/or contact force to be adhered to. This means that a tensile force can be introduced between the frame sections 128.1, 128.2; 128.3, 128.4 by the drive means 132 that, for example, can be adjusted or controlled by open loop control or controlled by closed loop control in a position-based or force-based manner, which moves the frame sections 128.1, 128.2; 128.3, 128.4 or rollers 102; 103; 102'; 103' toward or maintains these at a desired gap width or a desired contact force, possibly counter to the opposing forces caused by the material 004. In contrast to applying a pure push force to one of the two rollers 102; 103; 103'; 103' or frame sections 128.1; 128.2; 128.3; 128.4 from an outer side, this has the advantage that the contact force acts only on the relevant roller gap 104; 104'; 107; 107' and does not perhaps, for example by pushing the second roller 103 against a further roller 103'; 106, additionally and uncontrolled apply a force to an adjacent further, for example second, gap 107; 107', viewed in the adjustment direction. The at least one drive means 132 or the adjustment device 141 comprising the drive means 132 engages with the two active sides or active ends on the mutually adjacent rollers 102; 103; 103'; 103' or frame sections 128.1; 128.2; 128.3; 128.4, that is, in particular, in such a way that, for adjusting the relevant gap 104; 104'; 107 between the adjacent rollers 102; 103; 103'; 103', they apply adjustment forces that are directed toward each other to these or the frame sections 128.1; 128.2; 128.3; 128.4 thereof, that is, introduce a tensile force effectuating the movement and/or contact force between the two frame sections 128.1; 128.2; 128.3; 128.4, which provides the above-described advantage.

In the solution proposed here, thus one or more adjustment devices 141 comprising a drive means 132; 133, between two or respective two adjacent frame sections 128.1; 128.2; 128.3; 128.4, engage with the respective active ends thereof, that is, the ends of the drive means 132; 133 or of the adjustment device 141 that can be varied, by activation, in terms of the distance with respect to one another and/or in the tensile force that is exerted between them, on the adjacent frame sections 128.1; 128.2; 128.3; 128.4, so that a tensile force effectuating a relative movement between the frame sections and/or a contact force between the rollers can be introduced for a, for example position-based or force-based, throwing-on by the same between the two adjacent frame sections, that is, so that the adjustment device 141 or the drive means 132; 133 pulls the two rollers 102; 103; 102'; 103' or frame sections 128.1; 128.2; 128.3; 128.4 toward one another for a, for example position-based or force-based, throwing-on.

In the embodiments according to FIGS. 17 to 21, a drive means 133 that can be operated or is operated in a force-based manner, in particular can be operated or is operated force-controlled by open loop control or force-controlled by closed loop control, and/or a drive means 133 designed as a cylinder-piston system 133 that can be acted on by pressurized fluid, in particular hydraulically, are preferably provided for the adjustment of both the first and the second gap 104; 104'; 107; 107'. Such a cylinder-piston system 133 is preferably designed or configured so as to be able to apply a force of at least 20 kN, preferably at least 50 kN, in the relevant roller gap 104; 104'; 107; 107'. Preferably, at least two such cylinder-piston systems 133 that are effective between two adjacent frame sections are provided on each frame side, wherein, for example, the above-described force or linear force can be applied by these collectively.

The rollers 102; 102'; 103; 103'; 106 can generally be mounted so as to be rotatable on a respective shaft that is rotationally fixed in the frame walls 131.1; 131.2; 131.3; 131.4 of the respective frame sections 128.1; 128.2; 128.3; 128.4 via corresponding bearings 151 or, advantageously, as is shown in FIG. 17 to FIG. 21, by way of end-face roller journals in bearings 151 designed as radial bearings 151, wherein the bearings 151 in turn are provided or arranged in or on the relevant frame walls 131.1; 131.2; 131.3; 131.4. In both instances, the rollers 102; 102'; 103; 103'; 106 or the roller journals thereof or shafts, viewed in the axial direction, are effectively radially supported over a width b151 of the bearing 151, which is determined by one or more rows of bearing elements that support the roller journals or shafts against the relevant frame section 128.1; 128.2; 128.3, 128.4. In the case of the radial bearing 151 enabling a rotation, this can be one or more rows of roller bodies or sliding surfaces arranged in the circumferential direction. The effective support width b151 results from the distance between the two outer edges of the single bearing element row or the two outer bearing element rows.

In a particularly advantageous embodiment, for example with respect to minimal deformation, on two or respective two of the adjacent frame sections 128.1; 128.2; 128.3; 128.4 that can be varied in the distance with respect to one another and/or in the contact force against one another, an adjustment device 141 engages with the two active ends thereof, the distance between which can be varied, on one of the two frame sections 128.1; 128.2; 128.3; 128.4 in such a way that the same plane G extending perpendicular to the axis of rotation R102; R103, R102'; R103' of at least one of the rollers 102; 103; 102'; 103'; 106; 106' mounted on the two adjacent frame sections 128.1; 128.2; 128.3; 128.4, in particular extending within the frame wall width, intersects at least the respective support width b151, viewed in the axial direction, of the rollers 102; 103; 102'; 103'; 106; 106' mounted in the two frame sections 128.1; 128.2; 128.3; 128.4 as well as an engagement surface that is formed in the region of the active ends with the relevant respective frame section 128.1; 128.2; 128.3; 128.4, for example the cross-section of a compression and/or tension plate 143; 144 supported, at the end face of the adjustment device 141, on the relevant frame section 128.1; 128.2; 128.3; 128.4 or attached thereto, in particular even a working cross-section, that is, the effective piston or cylinder inner cross-sectional surface, in the cylinder of the drive means 133 formed, for example, by a cylinder-piston system 133. This ensures that the tensile stress engages in the alignment of the support and tilting in the bearing 151 caused by the tensile stress is avoided.

In a preferred embodiment, in all embodiments of the application units 101; 101' or double application units 101; 101' shown in connection with the frame sections 128.1; 128.2; 128.3; 128.4, the rollers 102; 103; 102'; 103'; 106, at least in the operating position, are arranged with respect to one another in such a way that the axes of rotation R102; R103, R102'; R103' thereof intersect the same connecting line in at least a radial alignment.

For the force-based drive means 133 or positioning drives 133, the force that can be applied by the drive means 133 can preferably be adjusted, in particular controlled by open loop control or controlled by closed loop control. In the case of cylinder-piston systems 133 that can be operated with pressurized fluid, for example with compressed air or preferably with a pressurized liquid (for example oil under overpressure), in particular the pressure of the pressurized fluid provided by a pressure source can be set, in particular controlled by open loop control or controlled by closed loop control, at least in an adjustment range required for operation, for example, via a pressure control valve or a pump that can be controlled by open loop control or by closed loop control with respect to the pressure to be provided on the output side.

For the case of the second roller gap 107; 107' provided or controlled by open loop control or closed loop control in a force-based manner and the first roller gap 104; 104' adjusted or adjustable, controlled by open loop control or closed loop control in a position-based manner, at least the respective first roller 102; 102' or the frame section 131.3; 131.4 thereof is not stationary within the scope of production operation, viewed in the adjustment direction, but is mounted so as to be movable or free at least within the adjustment range, for example, of at least ±5 μm. In this way, it is possible for the first roller 102; 102' to move up in the event that the distance d104; d104' between the first and second rollers 102; 103; 102'; 103' fluctuates due to possibly minor differences in material thickness levels.

Figure 22:
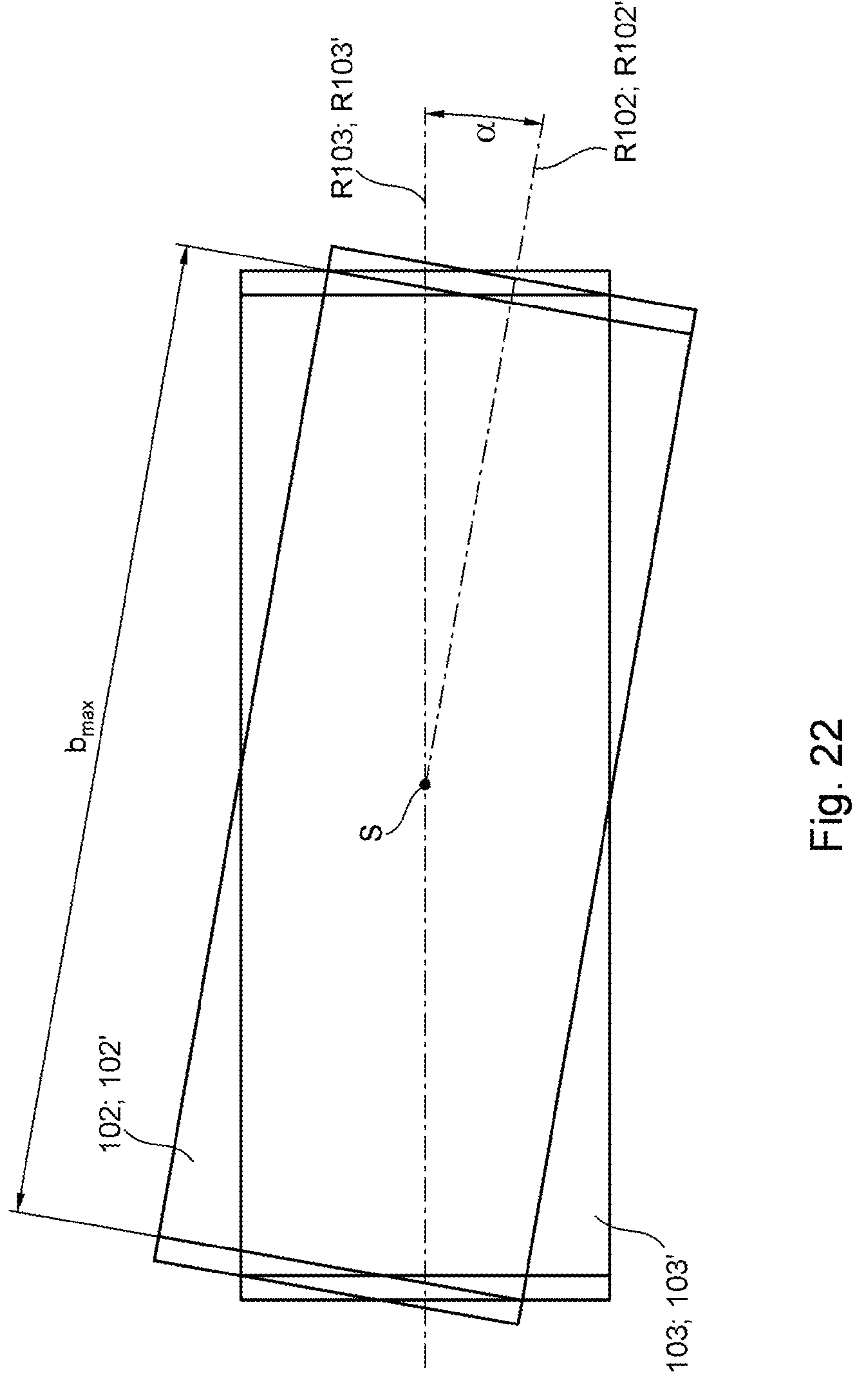
FIG. 22 a schematic diagram of two rollers having axes of rotation that are inclined with respect to one another.

Generally independently of, but advantageously in conjunction with one of the above-described embodiments, variants, configurations, specific embodiments or designs of the application units 101; 101' and/or coating devices 100; 100* and/or machine configurations and/or frames 128, the first and second rollers 102; 103; 102'; 103' in a particularly advantageous embodiment are mounted, or can be mounted, so as to be inclined with respect to one another, that is not parallel, with the R102; R103, R102'; R103' thereof, in general or in at least one operating situation (see, for example, sketch from FIG. 22). However, they preferably extend in two parallel planes.

If such a mounting is to take place in general and without any possibility for variation, the inclined arrangement can already be taken into consideration in the arrangement of the bearings 151 in a one-piece or multi-piece frame 128.1, 128.2, 128.3, 128.4.

The axes of rotation R102; R103; R102'; R103', however, can preferably be inclined with respect to one another, that is, can be inclined out of a parallel position into a position with respect to one another or at differing angles of inclination «. For example, one of the rollers 102; 102'; 103; 103', in particular the second roller 103, 103', over the course of the orientation of the R102; R102', R103; R103' thereof, is stationary in space during operation, even if it may be movable parallel in space without changing the inclination, and the other of the rollers 102; 102'; 103; 103', in particular the first roller 102; 102', is mounted with the axis of rotation R102; R102' being inclined with respect to the orientation of the R102; R102', R103; R103' and/or with respect to the course of the axis of rotation R102; R102', R103; R103' of the other roller 103; 103'; 102; 102', in particular second rollers 103; 103'. The pivoting preferably takes place about an actual or imaginary pivot axis which, for example, lies in a plane encompassing the axes of rotation R102; R102', R103; R103' of the two rollers 102; 103; 102'; 103' and/or preferably extends perpendicular to the axes of rotation R102; R103; R102'; R103' of both the first and the second roller 102; 103; 102'; 103' or intersects the axes of rotation R102; R103; R102'; R103' thereof.

Such an inclinability can generally be directly implemented via a special design of the mount accommodating the inclinable roller 102; 102'; 103; 103' in the frame 128. For example, a bearing 151, for example a bearing 151 encompassing an eccentric, can be provided, for example, on at least one side, preferably on both sides, by way of which a radial position of the relevant axis of rotation R102; R103, R102'; R103' in the bearing 151 can be varied. As an alternative, a radially movable bearing can be provided on one side, or preferably on both sides, on the frame 128, the movement of which can be used to radially vary the relevant bearing points.

Preferably, the first and the second roller 102; 103; 102'; 103' of the same application unit 101; 101', for example on the first and/or second application units 101; 101', corresponding to, for example, an embodiment described above or below of the multi-piece frame 128, are mounted in or on differing frame sections 128.1; 128.2; 128.3; 128.4, wherein one of the two frame sections 128.1; 128.2; 128.3; 128.4, preferably the frame section 128.3; 128.4 carrying the first roller 102; 102', overall, that is, including the assigned frame walls 131.1, 131.2, 131.3, 131.4, one or more crossbars 136; 137 and the roller 102; 103; 102'; 103' mounted therein, can be pivoted about a pivot axis S that extends perpendicular to the axis of rotation R103; R103; R102'; R103' and intersects the same on at least the maximum effective width of the roller 102; 103; 102'; 103' (see, for example, FIG. 17, FIG. 18, FIG. 19, FIG. 21 and FIG. 23).

Figure 23:
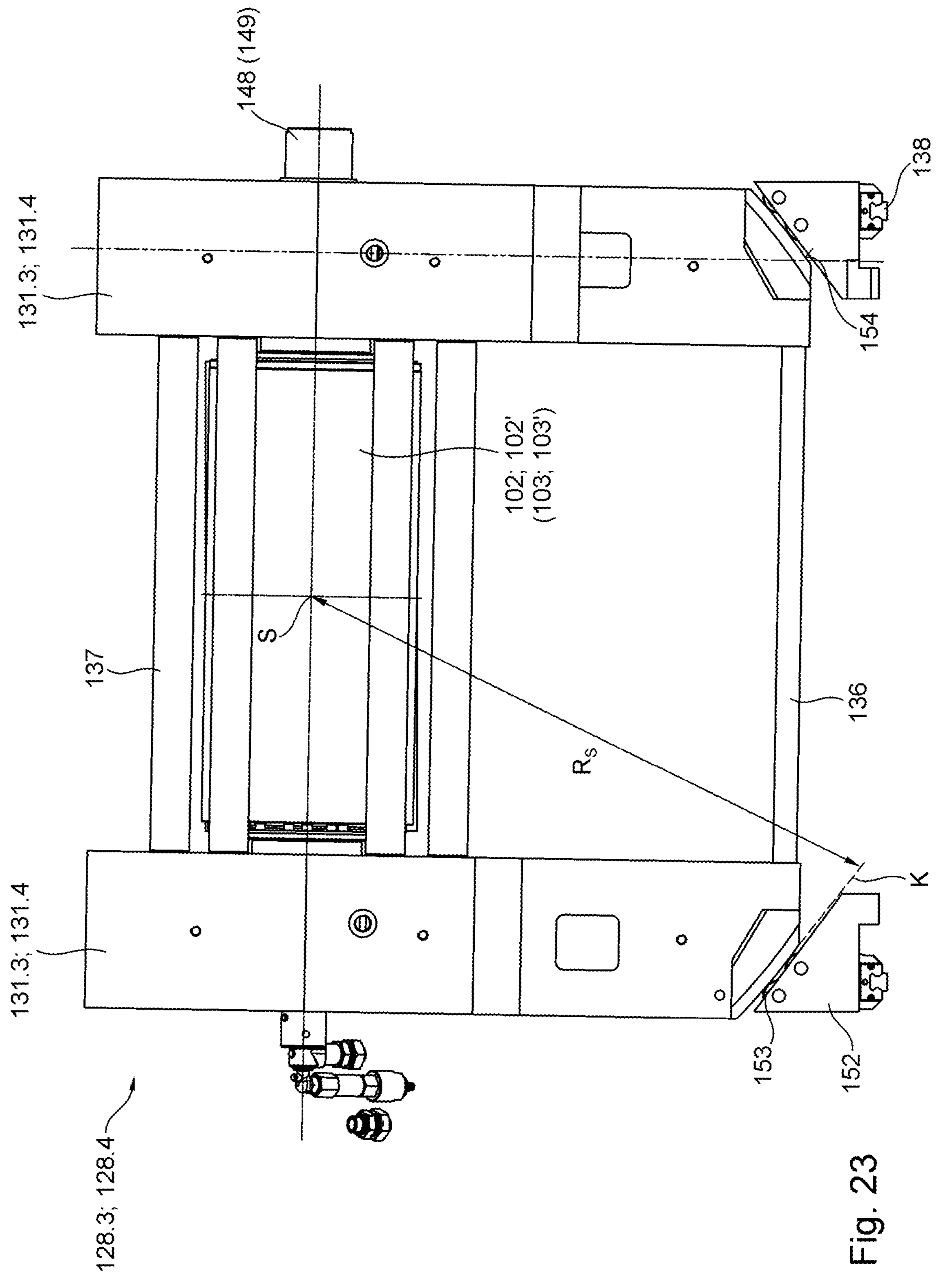
FIG. 23 a front view of a frame section having a mount that allows pivoting.

In an advantageous embodiment, the pivotable frame section 128.1; 128.2; 128.3; 128.4 is mounted on at least two bearing points 153 that are spaced apart from one another on at least two circular arcs K extending in the circumferential direction about the pivot axis S, wherein they are located in a radius $R_S$ on a circular arc K that extends about the pivot axis S and/or determines the position of the pivot axis (see, for example, FIG. 23). The bearing points 153 are, for example, formed by sliding bodies or preferably roller bodies 153, for example rollers, which are arranged in two bearing blocks 147 that are spaced apart from one another. The rollers can be rotated about an axis that is parallel to the pivot axis S. The radius $R_S$ of the circular arc K is, for example, larger than half the width, in particular than the total maximum usable width, of the roller 102; 103; 102; 103' pivoted with the frame section 128.1; 128.2; 128.3; 128.4. In this way, a large adjustment path can be implemented for minute changes in the inclination.

The bearing blocks 147 are, for example, mounted on guides 138 extending perpendicular to the axes of rotation R102; R103, R102'; R103' of the roller 102; 103; 102'; 103' carried by the pivotable frame section 128.1; 128.2; 128.3; 128.4 and can be displaced thereon together with the frame section 128.1; 128.2; 128.3; 128.4 mounted thereon in a direction perpendicular to the axis of rotation R102; R103; R102'; R103'.

In a preferred embodiment, the bearing points 153, for supporting the pivotable frame section 128.1; 128.2; 128.3; 128.4, cooperate with the bearing surfaces 154 facing the bearing points 153, which are arranged in a lower region of the frame section 128.1; 128.2; 128.3; 128.4, in particular in the region of the lower end of the two relevant frame walls 131.1, 131.2, 131.3, 131.4 and/or, at least within an adjustment range for the pivoting movement, viewed in the circumferential direction of the circular arc K, comprise a surface that is supported on at least one bearing point 153 and has a circular arc-shaped curved profile at least within an adjustment range. The radius of curvature preferably corresponds to the aforementioned radius $R_S$.

While, generally, a pivoting can be effectuated manually, an in particular remotely actuatable drive means, by way of which the relevant frame section 128.1; 128.2; 128.3; 128.4 can be pivoted is preferred. The pivoting or the angle of inclination α involves, for example, angles that range between 0.1° and 2.0°, in particular between 0.5° and 1.5°, preferably 1.0°. The adjustment range for the pivoting can then, for example, be a range of 0° to at least 1°, advantageously of 0° to at least 1.5°, or even of 0° to 2.0°, or possibly more.

What was said above with respect to the frame section 128.1; 128.2; 128.3; 128.4 that can be pivoted about the pivot axis S is to be applied to all embodiments described above with respect to the frame section 128; 128.1; 128.2; 128.3; 128.4, provided that the frame section 128.1; 128.3 of the first or second roller 102; 103, in particular of the first roller 102, of a simple application unit 101, that is, an application unit provided for the one-sided application, or the frame section 128.1; 128.2; 128.3; 128.4 of the first or second roller 102; 103, in particular of the first roller 102, of both application units 101; 101' of a double application unit 101, 101', can be pivoted in the above-described manner and is advantageously designed with above-described means.

Regardless of whether the roller 102; 103; 102'; 103' is pivoted together with or without the frame section 128.1, 128.2, 128.3, 128.4, the pivot axis S is preferably located in a plane encompassing the axes of rotation R102; R103; R102; R103' of the two adjacent rollers 102; 103; 102'; 103' and/or extends perpendicular at least to the axis of rotation R102; R103; R102'; R103' of the pivotable roller 102; 103; 102'; 103', advantageously to the axes of rotation R102; R103; R102'; R103' of both the first and the second roller 102; 103; 102; 103' and/or intersects at least the axis of rotation R102; R103; R102'; R103' of the pivotable roller 102; 103; 102'; 103', advantageously the axes of rotation R102; R103; R102'; R103' of both the first and the second rollers 102; 103; 102'; 103'. Advantageously, the pivot axis S of the pivotable roller 102; 102'; 103; 103' preferably intersects the axis of rotation R102; R103; R102'; R103' of the pivotable roller 102; 103; 102'; 103', advantageously the axes of rotation R102; R103; R102'; R103' of both the first and the second rollers 102; 103; 102'; 103', in the central region, that is, for example, no more than 15% of the usable length spaced apart from the center, or in particular at the level of the center of the maximum usable roller width. In the shown and preferred embodiment, the pivoting movement of the axis of rotation R102; R103, R102'; R103' takes place in a plane extending perpendicular to the pivot axis S, without the plane moving in the direction of the pivot axis during the pivoting and/or without the position of the pivot axis in space changing. This allows a pivoting that is independent of the throwing-on and throwing-off to be achieved, and vice versa.

In a preferred embodiment, in all embodiments of the application units 101; 101' or double application units 101, 101' shown in connection with the frame sections 128.1; 128.2; 128.3; 128.4, the rollers 102; 103; 102'; 103'; 106, at least in the operating position, are arranged with respect to one another in such a way that the axes of rotation R102; R103, R102'; R103' thereof intersect the same, here in particular horizontally extending, connecting line in at least a radial alignment along the axes of rotation R102; R103, R102'; R103'; R106. If one or more inclined rollers 102; 103; 102'; 103'; 106 are present, this connecting line coincides, for example, with the respective pivot axis. Without an inclined roller 102; 103; 102'; 103'; 106, the axes of rotation R102; R103, R102'; R103'; R106 are advantageously, as was previously described, for example, in an above-described variant embodiment, parallel and even located in the same, here in particular horizontally extending, plane.

For all above-described embodiments, variants, configurations, specific embodiments or designs, the positioning drive 109; 109'; 111; 111' and/or the bearing mechanism 112; 112'; 113; 113' comprised thereby at least of the rollers 103; 103'; 106; 106' forming the second gap 107; 107' are preferably designed to form, during normal operation, a gap width of at least 15 μm, advantageously of at least 30 μm, in particular of at least 50 μm, at the narrowest point and/or, in particular at least within boundaries defining the maximum adjustment path, to form a gap width arising between the two rollers 103; 106; 106'; 103' via a product strand 002; 002' to be formed and/or a contact pressure force or linear force caused by at least one positioning mechanism 112; 112' and/or at least one positioning drive 109; 109', and/or to set and/or apply, in the second gap 107; 107' at least in the region of the width contributing to the film formation and/or for the film application, a linear force of, for example, at least 500 N/mm, advantageously at least 700 N/mm, preferably a linear force between 500 N/mm and 3000 N/mm, between the rollers 103; 103'; 106; 106' forming the second gap 107; 107', and/or to enable keeping a desired linear force constant, even if the dry film thickness fluctuates, by repositioning at least one of the two rollers 103; 106; 106'; 103', for example automatically or in a controlled manner. In contrast to a repositioning that is controlled via a closed control loop, automatic repositioning is, for example, a repositioning that occurs by the drive means, which can preferably be adjusted in a force-based manner, in particular is force-controlled by open loop control or can be controlled by closed loop control, or the force application thereof itself and without readjustment via an additional control loop.

For all above-described embodiments, variants, configurations, specific embodiments or designs, in a particularly advantageous refinement an extraction unit 123; 123', by which potentially leaking gases or developing fumes can be extracted, is provided above the respective application unit 101; 101' or the application units 101; 101'.

The rollers 102; 102'; 103; 103'; 106; 106' of the above-described application units 101; 101' are preferably designed with a width in the range of 400 mm to 800 mm, in particular of 500 mm to 700 mm which can be used for film formation and/or for application.

A machine for producing, in particular in an inline process, a multi-layer product (see, for example, FIG. 3, FIG. 10, FIG. 15 or FIG. 16), which on at least one side of a carrier substrate 006 comprises an above-described dry film 003; 003' made of a powder mixture, preferably comprises a substrate infeed 200, by which the carrier substrate 006 can be fed to the machine on the input side, a first substrate path section 300, via which the carrier substrate 006 can be fed to an application stage 100; 100* for applying the dry film 003; 003' to at least one side of the carrier substrate 006, and a second substrate path section 400, via which the carrier material 006 provided on at least one side with the dry film 003 can be fed to a product receiving system 500, by which the product can be combined into product bundles, for example into reels or piles.

In a particularly preferred embodiment, the application stage 100; 100* is designed in an above-described embodiment, design, configuration, specific embodiment or variant for the above-described device 100; 100*. All embodiments, designs, configurations, specific embodiments of the first group of exemplary embodiments are to be able to take the place of the application stage 100 shown by way of example in FIG. 3, and all of the second group are to be able to take the place of the application stage 100* shown by way of example in FIG. 10, FIG. 15 or FIG. 16. In the exemplary embodiments for the machine shown in FIG. 15 and FIG. 16, it is also possible for embodiments, designs, configurations, specific embodiments or variants of the first group to be used as variants for the application stage 100, that is, comprising separate application devices 101; 101'.

In an advantageous embodiment, the substrate infeed 200 is formed by a substrate unwinder 200, in particular a reel changer 200, preferably by a reel changer 200 comprising several reel spots and/or qualified for a non-stop reel change. Advantageously, it can comprise a substrate guide element 202 designed as a roller 202 that is positively driven by a motor, in particular a draw roller 202, and/or a substrate guide element 203 in the form of a dancer roller 203, which, for example, is spring-preloaded or deflected by way of a force transversely to the substrate path at a lever or a guide.

At the substrate unwinder 200, the carrier substrate web 006 is unwound and fed, at the unwinding location, on the input side, to the substrate path leading through the machine.

For the case of a draw roller 202 that is comprised by the substrate unwinder and, for example, structurally assigned thereto (see, by way of example, in FIG. 3 or FIG. 10, for example), this draw roller can be comprised by a drawing unit 207, in particular infeed unit 207, which, for example, in addition to the draw roller 202 comprises a drive means that drives the draw roller 202, in particular independently of other draw rollers, and can be controlled by closed loop or open loop control in terms of the speed, in particular a drive motor, for example in the form of a servo motor, and/or comprises pressure rollers that can be placed against the draw roller 202 to increase the friction. The roller 202 or the drive means, depending on the web tension conditions and/or web tension requirements that exist in front of and after the roller 202, can also be operable or operated as a generator or so as to block the forward feed of the carrier substrate web 006, for example so as to build or maintain a certain and/or desired web tension in the substrate path section 300 that follows and extends, for example, up to a next clamping or web feed point or in a part of the substrate path section 300 formed by a following substrate path segment.

For example, still structurally assigned to the substrate path in the reel unwinder 200 or already assigned to the first substrate path section 300, a substrate guide element 208; 307 can be formed as a measuring roller 208, for example a web tension measuring roller 208; 307 (shown by way of example for all embodiments in FIG. 16, for example) in the substrate path, by which, for example, the web tension or at least a variable representing the web tension can be ascertained so as to use the same, for example, for controlling the web tension, for example via the conveying speed of individual units 100; 100*, 600 or one or more web guide elements 202; 308; 401; 502, which are in particular positively driven by a motor.

The substrate infeed 200 designed as a reel changer 200 advantageously comprises a reel drive, which is driven mechanically independently of the remainder of the machine and/or by an individual motor, and/or a lifting device for supporting a reel loading and/or reel unloading process.

Still located in the substrate path segment attributable to the substrate infeed 200 and/or in the following first substrate path 300, in an advantageous embodiment a device for the lateral web edge control 204 (shown by way of example for all embodiments in FIG. 15, for example), in particular a sensor system detecting a web edge and a control element effectuating a lateral offset of the carrier substrate, for example a turner bar pair that can be pivoted about an axis extending perpendicularly to the transport direction $T_S$, can be provided. In a particularly advantageous embodiment, the web edge controller 204 is combined with a gluing device 206, for example a gluing table 206.

Instead or in addition, in an advantageous embodiment a spreader, in particular a single-element or multi-element web guide element having a convexly extending outer cylindrical surface, is provided still in the substrate path segment of the substrate infeed 200 and/or in the first substrate path 300.

In an advantageous refinement, a one-piece or multi-piece pretreatment station 302, in particular a cleaning and/or deionizing station 302, is provided in the first substrate path 300, by way of which the carrier substrate 006 is or can be freed from superficial impurities, for example dust or cut-off residue, and/or electric charge carriers, on one side or both sides in a contactless or contacting method.

A measuring station 303, in particular comprising a sound-based or radiation-based measuring device 303, is provided in the first substrate path 300, in particular downstream from a possibly provided cleaning operation, by way of which the material thickness of the carrier material 006 can be checked for the thickness and/or homogeneity in the thickness and/or for impurities and, for example in the event of impermissible deviations from a target specification, an optical and/or an acoustic warning signal and/or an error signal is transmitted to a machine controller and/or a control console.

For all embodiments of the machine, in an advantageous embodiment a substrate guide element 208; 307 can be designed as a measuring roller 307 (shown by way of example for all embodiments in FIG. 15 and FIG. 16, for example) in a substrate path segment that is structurally assigned to the reel changer 200 and/or in a substrate path section of the first substrate path 300 following the same, by which, for example, the web tension can be ascertained so as to use it, for example, for controlling the web tension, for example, via the conveying speed of individual units 100;

100*; 600 or of one or more web guide elements 202; 308; 401; 502 which are, in particular, positively driven by a motor. It is possible for only one of the two measuring rollers 208; 307 to be provided or advantageously for both measuring rollers 208; 307 to be provided, wherein in the latter case, for example, the downstream measuring roller 307 is used for ascertaining purposes and/or for control, as described below, of the web tension in the substrate path segment arranged upstream from the first or only application point.

In an advantageous refinement, for example a pretreatment station 304 designed as an application station 304 is provided in the first substrate path 300, by which a binder and/or a primer can be applied to one side or both sides of the carrier material 006. In this case, a dryer, which is not shown, for example a hot air or radiation dryer, can preferably be provided directly downstream from the application station 304.

In a particularly preferred embodiment, generally considered alone, but advantageously in conjunction with one or more of the other variant embodiments of the machine, a thermal pretreatment station 306, in particular a temperature control station 306, for example an infrared radiation source 306, can be provided in the substrate path immediately upstream from the application stage 100; 100*, that is, for example, downstream from the last substrate guide element 301; 307 cooperating with the carrier substrate web 006, by which the carrier material 006 can preferably be heated to above the ambient temperature, in particular to above 60° C., preferably to at least 80° C. This can, for example, be of particular advantage for activating a cohesion-supporting or cohesion-inducing agent 007; 007' that is provided on or applied to the carrier substrate 006. Generally independently thereof, but advantageously in conjunction with such a temperature control station 306, a sensor 311 for ascertaining the temperature of the carrier substrate web 006, for example a temperature sensor 311, in particular a temperature sensor 311 operating in a contactless and/or radiation-based manner, can be provided. The sensor 311, for example as a temperature sensor 311, together with the possibly provided temperature control station 306, can be an integral part of a control loop for controlling the temperature of the carrier substrate web 006.

Instead of a draw roller 202 attributable to, or a drawing unit 207 attributable to, the substrate unwinder 200, or possibly in addition thereto, a draw roller 308 or a drawing unit 309 can be provided in the substrate path section 300 that follows the substrate unwinder 200 and/or leads to the point of the first or only dry film application, that is, to the first or only laminating gap 107; 107'. If only one draw roller 202; 308 or only one drawing unit 207; 309 is provided in the substrate path between where the unwinding from the reel 201 takes place and where the entry into the first or only laminating gap 107; 107' takes place, such a draw roller 202; 308 or such a drawing unit 207; 309 can generally structurally be assignable or assigned to the substrate unwinder 200, a substrate path section 300 extending between the substrate unwinder 200, in particular where the unwinding takes place, and the application stage 100; 100*, in particular the first or only application point, or can structurally be assignable or assigned also to the application stage 100; 100* on the input side. What is essential here is that such a draw roller 202; 308 or such a drawing unit 207; 309 is arranged upstream from the first application point, that is, the first or only laminating gap 107; 107', in the substrate path, for example so as to build or maintain a certain and/or desired web tension in the following substrate path section or in a part of the substrate path section formed by a following substrate path segment. Corresponding to the drawing unit 207 that was already described above, the drawing unit, for example in addition to the draw roller 308, comprises a drive means that drives the draw roller 308, in particular independently of other draw rollers, and that can be controlled by closed loop or open loop control in terms of the speed, for example in the form of a servo drive motor, and/or pressure rollers that can be placed against the draw roller 308 to increase the friction. Depending on the web tension conditions and/or web tension requirements that exist in front of and after the roller 308, the roller 308 or the drive means can also be operable or operated as a generator or so as to block the forward feed of the carrier substrate web 006, for example so as to build or maintain a certain and/or desired web tension in the substrate path section that follows and extends, for example, up to a next clamping or web feed point or in a part of the substrate path section formed by a following substrate path segment.

In an advantageous embodiment, an above-described calender 600 or an above-described calendering unit 600 comprising two rollers 601; 602, in particular calendering rollers 601; 602, forming a gap, for example calendering gap between each other, is provided in the second substrate path 400, in particular in the substrate path immediately downstream from the application stage 100; 100*. This, for example, has the advantage that, if the desired density is not produced during the dry film application, an end product 001, or an intermediate product 002 that only still has to be cut, can nonetheless be produced with the desired density in the active material layer 003; 003'.

In an alternative embodiment, which was previously mentioned above but is not shown in the figures, having its advantage, for example, in the independence of the processes and the optimization thereof, and thus in the quality and/or lower susceptibility to disruptions, for example in an installation or a system comprising multiple machines, a first above-described machine for coating a carrier substrate 006, in particular an above-described carrier substrate web 006, with a dry film 003; 003', which is made of powdered material 004; 004', is provided, which in the substrate path preferably comprises a coating device 100; 100* in one of the above-described embodiments, and a separate, second machine for compacting the dry film 003; 003' by means of at least one calendering unit 600; 600' that is provided in the substrate path of the second machine. These machines can generally be provided in different locations, but are preferably provided, for example in the same building, in a facility or machine arrangement for producing a multi-layer product 001 having a dry film that is applied to a carrier substrate, in particular for producing an electrode strand 002 or of electrode units 001. In this case, a product strand 002 that has not yet been post-compacted, which is referred to here as a pre-product, is combined on the output side of the machine for coating in the product receiving system 500, which is in particular designed as a product winder 500, into a roll 501 of pre-product, and this roll 501 is fed subsequently or at a later time to the second machine on the input side, in particular to a roll unwinder that is provided on the input side of this machine. The product strand 002 made of the pre-product is unwound there, guided through a calendering unit 600; 600' arranged in the substrate path, and wound on the output side to form a product roll 501, serving as the fully compacted product strand 001, or is laid out after cross-cutting, which may be provided downstream from the calendering unit 600.

Regardless of whether an above-described calendering process takes place inline in the same machine, in which the dry film 003; 003' is applied to the carrier substrate 006, or whether a calendering takes place in another, second machine comprising, for example, a calendering unit 600; 600*, separately from the application, the calendering unit 600; 600* comprises two rollers 601; 601*; 602; 602*, for example calendering rollers 601; 601*; 602; 602*, of which, for example, at least one, preferably both, can be heated, in particular can be heated in such a way that the outer cylindrical surfaces thereof, for example, at an ambient temperature of 25° C., can be brought to at least 80° C., advantageously to at least 100° C., preferably to at least 120, and/or between which a compression with a preferably adjustable linear force of at least 500 N/mm, advantageously at least 700 N/mm, in particular at least 1000 N/mm, preferably up to at least 2000 N/mm, or in particular a linear force between 500 N/mm and 3000 N/mm, can be applied. The product strand 002 coated at least on one side can be guided through the calendering gap for the purpose of further compacting the dry film 003; 003', using pressure and/or an increased temperature in relation to the ambient temperature. The calendering rollers 601; 601*; 602; 602*, for example, have a diameter of at least 400 mm, in particular at least 500 mm, preferably at least 550 mm, and/or, for example, have a usable width of, for example, at least 400 mm, in particular at least 500 mm, preferably at least 550 mm. For producing the aforementioned products 001; 002, a concentricity per roller 601; 601*; 602; 602* having a maximum deviation of no more than ±2 m, preferably of no more than ±1 mm, is particularly advantageous.

Generally independently of, but advantageously in conjunction with one or more of the other variant embodiments of the machine, in a particularly advantageous embodiment a cooling unit 402, for example comprising one or more partially wrapped temperature-controlled cooling rollers 402.1; 402.2, is provided in the second substrate path 400 downstream from the application stage 100; 100*, and if a calendering unit 600 is provided, downstream therefrom, by which a product strand 002 that is guided through can be cooled, for example, by at least 20° C., in particular by at least 50° C.

Generally independently of, but advantageously in conjunction with one or more of the other variant embodiments of the machine, in an advantageous refinement an inspection device 403; 403.1; 403.2, which is in particular based on an optical and/or acoustic measurement, for example comprising one sensor 403.1 that is directed toward one side and one sensor 403.2 that is directed toward the other side, is provided in the second substrate path 400, by which the product surface can be checked for defects or imperfections, for example for the completeness of the surface and/or thickness of the applied dry film 003; 003'. As is shown in FIG. 15, for example, the inspection device 403; 403.1; 403.2 can be provided in the substrate path downstream from the calendering unit 600 or, as is shown in FIG. 16, for example, in the substrate path downstream from the application stage 100; 100', but upstream from the calendering unit 600. In the first case, defects caused by the calendering process can be recognized, however, in the second case, defects that may be caused in the application stage 100; 100' are determined as early as possible. The inspection device 403 can preferably comprise a camera, for example a line camera, on each side, preferably serving as the sensors 403.1; 403.2, by which the respective surface is recorded or optically scanned, and defective or missing spots are evaluated by way of a downstream evaluation unit.

Generally independently of, but advantageously also together with other variant embodiments of the machine, in particular, however, in conjunction with an inspection device 403; 403.1; 403.2 provided at the substrate path, a device for defect marking 412 is provided in an advantageous refinement, which can be formed, for example, by a printing device, for example an ink jet print head, or an injection device, wherein the latter, for example, can introduce a physical marking means, for example a so-called marking flag or a marking label, into or apply the same to the carrier substrate web 006.

For all embodiments of the machine, in an advantageous embodiment at least one substrate guide element 409 can be designed as a measuring roller 409 in the second substrate path 400, by which, for example, the web tension can be ascertained so as to use it, for example, for controlling the web tension, for example, via the relative conveying speed of individual units 100; 100*; 600 or of one or more web guide elements 202; 308; 401; 502 which are, in particular, positively driven by a motor. Preferably, at least one substrate guide element 409 is designed as a measuring roller 409 at least in the substrate path segment of the second substrate path section 400 which is arranged downstream from the application stage 100; 100*, in particular the point of the last or only application, and arranged upstream from a possibly provided calendering unit 600, in particular the point of a possibly occurring calendering process, in particular preferably, however, both in the described substrate path segment and in the substrate path segment arranged downstream from the calendering unit 600 that is provided in an advantageous embodiment. Instead of or in addition, a substrate guide element 507, which is structurally assigned to the product winder 500, can be designed as a measuring roller 507 that is arranged downstream from the calendering unit 600 in the substrate path.

So as to be able to ensure that the substrate moves optimally through the application stage 100; 100*, in an advantageous embodiment a substrate guide element 401, which is designed as a draw roller 401 that is positively driven by a motor, is provided in the second substrate path 400, preferably immediately downstream from the application stage 100; 100*, but upstream from a possibly provided calendering unit 600. This draw roller can be comprised by a drawing unit 411, which, for example in addition to the draw roller 401 itself, comprises a drive means that drives the draw roller 401, in particular independently of other draw rollers, and that can be controlled by closed loop or open loop control in terms of the speed, for example in the form of a servo drive motor, and/or pressure rollers that can be placed against the draw roller 401 to increase the friction. Depending on the web tension conditions and/or web tension requirements present upstream and downstream from the roller 401, the roller 401 or the drive means can generally also be operable or operated as a generator or so as to block the forward feed of the carrier substrate web 006, however here is operated or operable so as to build and/or maintain a web tension on the upstream substrate path segment by way of a motor, that is, so as to convey the carrier substrate web 006 in the transport direction $T_S$ or with a lead compared to, for example, the speed at a next draw roller 202; 301 upstream and/or the circumferential speed of the last or only laminating roller 107; 107' or of the pair of laminating rollers 107; 107'.

As an alternative or in addition, in a preferred embodiment a web tension equalizing and/or control device 406 (for example, shown by way of example for all embodiments in FIG. 15), comprising, for example, a dancer roller 407, which is spring-preloaded transversely to the substrate path or deflected by a force, for example, at a lever or a guide, is provided in the second substrate path 400 downstream from the application stage 100; 100*, possibly between the application stage 100; 100* and a calendering unit 600 provided in an advantageous embodiment, by which, for example, fluctuations in the web tension can be equalized and/or the conveying speed of an upstream or downstream subassembly 100; 100*; 600 or of one or more in particular motor-driven web guide elements 202; 308; 401; 502 can be controlled, in particular via the movement of the dancer roller 407.

For all of the embodiments and variants of the machine described here, one embodiment is particularly advantageous in which a measuring station 408 for ascertaining the product strand thickness, in particular the total thickness, is provided in the substrate path arranged downstream from the application stage 100; 100*, and if a calendering unit 600; 600 is provided in the substrate path, downstream from a single or last calendering unit 600; 600, prior to the combination into the product bundle 501 in the product receiving system (for example, shown by way of example for all embodiments in FIG. 15 and FIG. 16).

Instead of or in addition to the above-described cooling unit 402 in the second substrate path section 400, such a or a further cooling unit 402; 504 can also be provided in the substrate path segment attributable to the product receiving system 500 or at the frame thereof. Such a cooling unit 504, can, for example, be formed by a substrate guide element 504 designed as a cooling roller 504. As an alternative, such a cooling unit 504 attributable to the second substrate path section 400 or structurally to the product receiving system 500 can also be formed by one or more consecutively partially wrapped temperature-controlled cooling rollers 504.1; 504.2.

In a refinement, for example downstream from the possibly provided cooling unit 504, sensor 508 for ascertaining the temperature of the product 002, in particular of the product strand 002, can be in the substrate path downstream from the possibly provided calendering unit 600, however at the latest upstream from the delivery, for example upstream from a winding operation in the product winder 500. The sensor 508, for example as a temperature sensor 508, is in particular designed to be a contactless and/or radiation-based operating temperature sensor 311 and/or can, together with the possibly provided cooling unit 504, be an integral part of a control loop for controlling the temperature.

In an advantageous embodiment, the product receiving system 500 is designed as a product winder 500, in particular in the form of a reel changer 500.

The product winder 500 is preferably qualified for a non-stop reel change and/or comprises an above-described substrate guide element 502 designed as a draw roller 502 that is positively driven by a motor and/or a substrate guide element 503 in the form of a dancer roller 503, which, for example, is spring-preloaded transversely to the substrate path or deflected by a force at a lever or a guide.

So as to be able to ensure that the substrate moves optimally between the possibly provided calendering unit 600 and where the winding on the product winder 500 takes place, in an advantageous embodiment a substrate guide element 401; 502 designed as a draw roller 401; 502 that is positively driven by a motor can be provided in the second substrate path 400 or in a substrate path segment attributable to the product winder 500. This draw roller can be comprised by a drawing unit 411; 506, which, for example in the addition to the draw roller 401; 502, comprises a drive means that drives the draw roller 401; 502, in particular independently of other draw rollers, and that can be controlled by closed loop or open loop control in terms of the speed, for example in the form of a servo drive motor, and/or pressure rollers that can be placed against the draw roller 401; 502 to increase the friction.

In a particularly advantageous embodiment of a machine comprising, for example, a calendering unit 600, in particular for the stable and trouble-free inline continuous operation, at least one positively driven draw roller 202; 308; 401; 502 and/or at least one measuring roller 208; 307; 409 for ascertaining a web tension are provided both in a first substrate path segment, which is located between the unwinding location from the substrate reel 201 in the substrate unwinder 200 and the entry into the only or first laminating gap 107; 107' of the application stage 100; 100*, and in a second substrate path segment, which is located between the exit location of the carrier substrate web, which by then has been provided with the dry film 003; 003' at least on one side, out of the only or downstream last laminating gap 107; 107' of the application stage 100; 100* and, for the embodiment comprising a calendering unit 600; 600*, the entry into the calendering gap between the two calendering rollers 601; 602. In an advantageous refinement for the embodiment comprising the calendering subassembly 600; 600*, a positively driven draw roller 502 and/or a measuring roller 409; 507 for ascertaining a web tension are also provided in a third substrate path segment, which is located between the exit location of the carrier substrate web 006, which has been provided with the dry film 003; 003' at least on one side, out of the calendering gap and the winding location onto the product roll 501 in the product winder 500.

Preferably a web tension control device, which is not shown here, is provided, which on the input side are connected in each case to the or a measuring roller 208; 307; 409 provided in the first as well as the or a measuring roller provided in the second above-described substrate path segment and, on the output side are connected in each case to a drive controller, controlling the roller drives, of the or a draw roller 202; 308; 401 provided in the first as well as the or a draw roller provided in the second above-described substrate path segment, and which in particular comprises data processing means and/or electronic circuit means, which are equipped to build and/or to maintain a respective specified web tension and/or a web tension difference specified for the two substrate path segments by appropriate activation of the drive controller of the drive of one or more of the draw rollers 202; 308; 401 in each of the two substrate path segments. In a refinement, the web tension control device, on the input side, can additionally be connected in each case to the or a measuring roller 409; 507 provided in the third above-described substrate path segment and, on the output side, to a drive controller, controlling the drive of the relevant draw roller 502, of the or a draw roller 502 provided in the third above-described substrate path segment and, for example, can likewise be controlled by the same with respect to a specified web tension and/or a specified web tension difference relative to the upstream substrate path segment.

Generally speaking, in particular also for an embodiment of the machine without a calendering unit downstream from the application stage 100; 100*, what was said above regarding the draw rollers 202; 308; 401; 502 and measuring rollers 208; 307; 409, regarding the signal connections and regarding the web tension control device, is to be transferred or applied to an embodiment comprising at least one measuring roller and/or at least one draw roller 208; 307; 202; 308 in the first substrate path segment between where the unwinding takes place and the point of the initial application by the application stage 100; 100*, and at least one measuring roller and/or at least one draw roller 409; 507; 401; 502 in a substrate path segment between where the only or last point of the dry film application by the application stage 100; 100* is left and where the winding in the reel winder 500 takes place.

Fluctuations in the web tension, for example, can be equalized and/or compensated by an above-described dancer roller 203; 407; 503 and a control loop comprising the same, and, for example, integrated in an above-described web tension control device, and/or a conveying speed of an upstream or downstream unit 100; 100*; 600 or of one or more, in particular motor-driven, web guide elements 202; 308; 401; 502, such as the drive of an upstream substrate unwinder 200 or downstream substrate winder 500 or an upstream or downstream draw roller 202; 308; 401; 502 can be controlled, in particular via the movement of the dancer roller 407. The dancer roller is spring-preloaded transversely to the substrate path, for example at a guide or at a lever, in particular pneumatically or elastically preloaded with a force against the effective direction of the web tension of the substrate web 006 wrapping around the roller in a loop-like manner (or of the product strand 002).

An above-described draw roller 203; 308; 401; 502 comprises, for example, a drive motor that can be controlled by closed loop or open loop control in terms of the speed, in particular a servo motor, and/or cooperates with one or more pressing elements, for example pressure rollers, for example for improving the conveying behavior, and/or can, depending on the position in the substrate path, for example for generating or maintaining an upstream web tension, be operated as a motor or, for example for generating or maintaining a downstream web tension, be operated as a generator, for example with braking action, and/or is comprised by a control loop, for example as a control element, which controls the web tension, and for example, is integrated into an above-described web tension control device.

As an alternative to the embodiment of the machine comprising a product receiving system 500 designed as a roll winder 500, in a particularly advantageous embodiment a cross-cutting device can be provided in the second substrate path 400 or at the input of the product receiving system 500, by which a product strand 002 produced in the machine can already be cross-cut into product sections 001. The product receiving system 500 is designed, for example, as a stack former, in particular as a multi-stack former consecutively forming multiple stacks.

In an above-described machine and/or device 100; 100*, for example, a web-format carrier substrate 006 is provided continuously, and preferably on both sides, with a dry film 003; 003' having a smaller width in relation to the carrier substrate width, so that an uncoated edge of the carrier substrate remains on both sides.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A device for coating a carrier substrate with a powdered material, comprising at least one first application unit, which comprises a first roller and a second roller, adjacent to the first roller, forming, in a nip between outer cylindrical surfaces thereof, a first gap through which the powdered material can be conveyed to form a dry film, the second roller or a further roller following downstream from the second roller, viewed in a direction of a material stream, together with a roller that is effective as a counter-pressure roller forming a second gap, through which a carrier substrate to be coated can be guided and can have the dry film formed in the first gap applied thereto, characterized in that the first and the second rollers can be inclined with respect to one another based on the relative progression of the axes of rotation thereof and can be varied in the relative inclinations thereof in that the first or the second roller is mounted in the device so as to be pivotable about an actual or imaginary pivot axis which extends perpendicular to the axis of rotation of the pivotable roller and of the other of the two rollers, and that the first and the second rollers of the first application unit are mounted in or on differing frame sections, and that the frame section carrying the pivotable roller overall, that is, including frame walls that are assigned on both sides of the pivotable roller and connected to one another and the pivotable roller carried by these frame walls, can be pivoted about the pivot axis.

2. The device according to claim 1, characterized in that the axes of rotation extending inclined with respect to one another are located in two parallel planes.

3. The device according to claim 1, characterized in that a pivotable mount is provided and/or configured in such a way that a pivoting movement of the axis of rotation of the pivotable roller takes place in a plane that extends at least one of:

perpendicular to the pivot axis, perpendicular to an adjustment direction for adjustment of a distance between the first and the second roller, or perpendicular to an adjustment direction for adjustment of a contact force between the first and the second roller, and wherein the pivoting movement takes place without this plane moving toward the pivot axis as a result of the pivoting movement and without the pivot axis changing a position thereof in space.

4. The device according to claim 1, characterized in that the frame walls of the frame section carrying the pivotable roller are rigidly connected to one another via one or more crossbars.

5. The device according to claim 1, characterized in that the frame section carrying the pivotable roller rests on at least two bearing points that are spaced apart from one another in a circumferential direction of a circular arc extending at a radius about the pivot axis.

6. The device according to claim 5, characterized in that the at least two bearing points are formed by roller bodies or sliding bodies which are arranged in two bearing blocks that are spaced apart from one another on the circular arc.

7. The device according to claim 6, characterized in that the two bearing blocks are mounted on guides extending perpendicular to the axis of rotation of the pivotable roller carried by a non-pivotable frame section and can be displaced thereon in a direction perpendicular to the axis of rotation of the pivotable roller.

8. The device according to claim 5, characterized in that the frame section carrying the pivotable roller is a pivotable frame section, and the least two bearing points support the pivotable frame section and cooperate with bearing surfaces facing the at least two bearing points, wherein the bearing surfaces are arranged in a lower region of the frame section and/or, at least within an adjustment range for enabling a pivoting movement of the pivotable frame, viewed in the circumferential direction of the circular arc, and wherein each bearing surface includes a surface that is supported on at least one bearing point and has a circular arc-shaped curved profile at least within an adjustment range.

9. The device according to claim 5, characterized in that the frame section carrying the pivotable roller can be pivoted by a drive means.

10. The device according to claim 1, characterized in that the roller effective as a counter-pressure roller can be set in a radial direction against the second or further roller, but and is mounted fixed to a frame in the device with respect to the inclination of the axis of rotation thereof.

11. The device according to claim 10, characterized in that the roller effective as a counter-pressure roller is an integral part of a second application unit, which, as a second roller of the second application unit, together with a first roller of the second application unit forms a further first roller gap.

12. The device according to claim 11, characterized in that the first and the second rollers of the second application unit are mounted in or on differing frame sections, and the frame section carrying the first or the second roller of the second application unit, including assigned frame walls and the roller mounted therein or thereon, can be pivoted about another pivot axis.

13. The device according to claim 1, characterized in that the pivot axis intersects the axis of rotation of the pivotable roller and/or an adjacent other roller.

14. The device according to claim 1, characterized in that the pivot axis intersects the axis of rotation of the pivotable roller and/or an adjacent other roller at least in a central region or at a level of a center of a maximum usable width thereof.

* * * * *